(12) United States Patent
Beall et al.

(10) Patent No.: US 7,648,550 B2
(45) Date of Patent: *Jan. 19, 2010

(54) NARROW PORE SIZE DISTRIBUTION CORDIERITE CERAMIC HONEYCOMB ARTICLES AND METHODS FOR MANUFACTURING SAME

(75) Inventors: Douglas Munroe Beall, Painted Post, NY (US); Isabelle Marie Melscoet-Chauvel, Painted Post, NY (US); Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/510,227

(22) Filed: Aug. 25, 2006

(65) Prior Publication Data

US 2008/0047243 A1 Feb. 28, 2008

(51) Int. Cl.
*B01D 39/06* (2006.01)
*B01D 24/00* (2006.01)
*B01D 39/14* (2006.01)
*B01D 50/00* (2006.01)
*F01N 3/10* (2006.01)
*F01N 3/08* (2006.01)

(52) U.S. Cl. .............................. 55/523; 55/522; 55/524; 422/170; 422/171; 422/172; 422/173; 422/174; 422/175; 422/176; 422/177; 422/178; 422/179; 422/180; 422/181; 422/182

(58) Field of Classification Search ........... 55/522–524; 422/170–182
See application file for complete search history.

(56) References Cited

U.S. PATENT DOCUMENTS 3,950,175 A 4/1976 Lachman et al. .......... 106/40 R (Continued)

FOREIGN PATENT DOCUMENTS

EP 0753490 A1 7/1996

(Continued)

OTHER PUBLICATIONS

SAE Technical Paper Series, 2001-01-0193, G.A. Merkel, D.M. Beal, D.L. Hickman and M.J. Vernacotola, "Effects of Microstructure and Cell Geometry on Performance of Cordierite Diesel Particulate Filters", 2001, pp. 1-14.

(Continued)

*Primary Examiner*—Walter D Griffin
*Assistant Examiner*—Amber Orlando
(74) *Attorney, Agent, or Firm*—Matthew B. McNutt

(57) ABSTRACT

Disclosed are ceramic honeycomb articles, which are composed predominately of a crystalline phase cordierite composition. The ceramic honeycomb articles possess a microstructure characterized by a unique combination of relatively high total porosity of less than 54%, and relatively narrow pore size distribution having a $d_{10}$ pore diameter of not less than 8 µm, a $d_{90}$ pore diameter of not greater than 35 µm, and a value of $d_f = (d_{50} - d_{10})/d_{50}$ of less than 0.50. The articles exhibit high thermal durability and high filtration efficiency coupled with low pressure drop across the filter. Such ceramic articles are particularly well suited for filtration applications, such as diesel exhaust filters or DPFs. Also disclosed are methods for manufacturing the ceramic articles of the present invention.

48 Claims, 8 Drawing Sheets

U.S. PATENT DOCUMENTS

| | | | |
|---|---|---|---|
| 4,280,845 A | 7/1981 | Matsuhisa et al. | 106/62 |
| 4,632,683 A | 12/1986 | Fukutani et al. | 55/523 |
| 5,258,150 A | 11/1993 | Merkel et al. | 264/43 |
| 5,545,243 A | 8/1996 | Kotani et al. | 55/523 |
| 6,004,501 A | 12/1999 | Cornelius et al. | 264/631 |
| 6,541,407 B2 | 4/2003 | Beall et al. | 501/119 |
| 6,773,481 B2 | 8/2004 | Noguchi et al. | 55/523 |
| 6,800,108 B2 | 10/2004 | Noda | 55/523 |
| 6,803,086 B2 | 10/2004 | Noguchi et al. | 428/116 |
| 6,814,774 B2 | 11/2004 | Ishihara et al. | 55/523 |
| 6,818,580 B2 | 11/2004 | Kumazawa et al. | 501/119 |
| 6,827,754 B2 | 12/2004 | Suwabe et al. | 55/523 |
| 6,864,198 B2 | 3/2005 | Merkel | 501/80 |
| 6,887,826 B2 | 5/2005 | Nishimura et al. | 502/527.19 |
| 7,485,170 B2 * | 2/2009 | Beall et al. | 55/523 |
| 2004/0029707 A1 | 2/2004 | Beall et al. | 501/119 |
| 2004/0148916 A1 | 8/2004 | Merkel | 55/523 |
| 2004/0261384 A1 | 12/2004 | Merkel et al. | 55/523 |
| 2005/0069469 A1 | 3/2005 | Fu et al. | 422/177 |
| 2006/0021308 A1 | 2/2006 | Merkel | 55/523 |
| 2006/0178265 A1 | 8/2006 | Kita et al. | 502/439 |
| 2007/0119133 A1 * | 5/2007 | Beall et al. | 55/523 |

FOREIGN PATENT DOCUMENTS

EP          1 666 436 A1     7/2006

OTHER PUBLICATIONS

SAE Technical Paper Series, 2000-01-2844, W.A. Cutler and G.A. Merkel, "A New High Temperature Ceramic Material For Diesel Particulate Filter Applications", 2000, pp. 1-11.

SAE Technical Paper Series, 920144 (Abstract), Jun Kitagawa et al., "Improvement of pore size distribution of wall flow type diesel particulate filter", 1992, p. 1.

* cited by examiner

NARROW PORE SIZE DISTRIBUTION CORDIERITE CERAMIC HONEYCOMB ARTICLES AND METHODS FOR MANUFACTURING SAME

BACKGROUND OF THE INVENTION

1. Field of the Invention

The present invention relates to ceramic articles, and more particularly to porous cordierite-containing ceramic honeycomb articles having properties suitable for use in exhaust after-treatment applications, particularly diesel exhaust filtration, and methods for manufacturing such articles.

2. Technical Background

Recently, much interest has been directed towards the diesel engine due to its fuel efficiency, durability and economical aspects. However, diesel emissions have been scrutinized both in the United States and Europe, for their possibly harmful effects. As such, stricter environmental regulations will likely require diesel engines to be held to similar standards as gasoline engines. Therefore, diesel engine manufacturers and emission-control companies are working to achieve a diesel engine which is faster, cleaner and meets stringent emissions requirements under all operating conditions with minimal cost to the consumer.

One of the biggest challenges in lowering diesel emissions is controlling the levels of diesel particulate material present in the diesel exhaust stream. Diesel particulate material consists mainly of carbon soot. One way of removing the carbon soot from the diesel exhaust is through the use of diesel traps (otherwise referred to as "wall-flow filters" or "diesel particulate filters"). Diesel particulate filters capture the soot in the diesel exhaust on or in the porous walls of the filter body. The diesel particulate filter is designed to provide for nearly complete filtration of soot without significantly hindering the exhaust flow. However, as the layer of soot collects in the inlet channels of the diesel particulate filter, the lower permeability of the soot layer causes a gradual rise in the back pressure of the filter against the engine, causing the engine to work harder. Thus, once the carbon soot in the filter has accumulated to some level, the filter must be regenerated by burning out the soot, thereby restoring the back pressure again to low levels. Normally, this regeneration is accomplished under controlled conditions of engine management whereby a slow burn is initiated which lasts for a number of minutes, during which the temperature in the filter rises from a lower operational temperature to a maximum temperature.

Cordierite, being a low-cost material, in combination with offering a relatively low coefficient of thermal expansion (CTE), has been the material of choice in diesel exhaust filtration. To that end, porous cordierite ceramic filters of the wall-flow type have been utilized for the removal of particles in the exhaust stream from some diesel engines since the early 1980s. A diesel particulate filter (DPF) ideally should combine low CTE (for thermal shock resistance), low pressure drop (for fuel efficiency), high filtration efficiency (for high removal of particles from the exhaust stream), high strength (to survive handling, canning, and vibration in use), and low cost. However, achieving this combination of features has proven elusive with cordierite DPFs.

Thus, DPF design requires the balancing of several properties, including porosity, pore size distribution, thermal expansion, strength, elastic modulus, pressure drop, and manufacturability. Further, several engineering tradeoffs have been required in order to fabricate a filter having an acceptable combination of physical properties and processability. For example, increased porosity is often attainable through the use of coarser raw materials, the use of pore forming agents, and or lower sintering temperatures. However, each of these may result in an increase in thermal expansion which may compromise the survivability of the filter in use.

Thus, it would be considered a significant advancement in the art to obtain optimized ceramic honeycomb articles, made of cordierite which are suitable for use in filter applications and which exhibit high thermal durability and high filtration efficiency coupled with low pressure drop across the filter. In particular, there is a recognized need in the art for cordierite ceramic honeycomb articles which possess desirable combinations of porosity, relatively narrow pore size distribution, and relatively low coefficient of thermal expansion (CTE). To that end, as described below, the present invention provides such cordierite honeycomb articles and methods of manufacturing therefor.

SUMMARY OF THE INVENTION

The present invention relates to ceramic honeycomb articles, and more particularly to cordierite-containing ceramic honeycomb articles having properties suitable for use in exhaust after-treatment applications; particularly in diesel exhaust filtration.

In a first aspect of the present invention, a porous ceramic honeycomb article is provided having a novel combination of volume percent porosity and pore size distribution. Specifically, the article comprises less than 54% total porosity, a $d_{10}$ pore diameter of not less than 8 µm, a $d_{90}$ pore diameter of not greater than 35 µm, and a value of $d_f=(d_{50}-d_{10})/d_{50}$ of less than or equal to 0.50. According to certain embodiments, the total porosity is greater than or equal to 40%. The inventive article is especially suitable for use as a wall-flow diesel particulate filter, wherein the inventive pore microstructure provides low clean and soot-loaded pressure drop in the catalyzed or non-catalyzed state, high filtration efficiency, and high strength.

The inventive ceramic honeycomb articles of the invention are suitable for use in high temperature applications, and are particularly suitable for use as diesel exhaust filtration devices because they exhibit low pressure drops, high filtration efficiency and good strength. To this end, in another aspect, there is provided a ceramic honeycomb article exhibiting the structure of a filter and having an inlet end and an outlet end, a multiplicity of cells extending from the inlet end to the outlet end, the cells having porous walls, wherein part of the total number of cells at the inlet end are plugged along a portion of their lengths, and the remaining part of the cells that are open at the inlet end are preferably plugged at the outlet end along a portion of their lengths, so that an engine exhaust stream passing through the cells of the honeycomb from the inlet end to the outlet end flows into the open cells, then through the cells walls, and out of the article through the open cells at the outlet end.

In another aspect of the present invention, a method for manufacturing a porous ceramic honeycomb article, as described above, is provided. The method comprises the steps of providing a plasticized cordierite precursor batch composition containing inorganic batch components; an optional pore former; a liquid vehicle; and a binder. A honeycomb green body is then formed from the plasticized ceramic precursor batch composition and subsequently fired under conditions effective to convert the green body into a ceramic honeycomb article containing cordierite. In one aspect, the resulting fired ceramic honeycomb article has a total porosity of less than 54%. In a further aspect, the honeycomb article exhibits a narrow pore size distribution characterized by a $d_{10}$ pore diameter of not less than 8 μm, a $d_{90}$ pore diameter of not greater than 35 μm, and a value of $d_f=(d_{50}-d_{10})/d_{50}$ of less than or equal to 0.50.

Also provided is a method for manufacturing the inventive article comprising certain combinations of raw materials and heating rates that satisfy the relation $P_{10} \geq 18.5$, where $P_{10}$ is defined as $P_{10}=3.503[\log_{10}(HR1)]+3.106[\log_{10}(HR2)]+0.00446[(wt \% \text{ talc sources})(d_{50} \text{ talc sources})]+0.00497[(wt \% \text{ silica-forming sources})(d_{50} \text{ silica-forming sources})]+0.00857[(wt \% \text{ alumina-forming sources})(d_{50} \text{ alumina-forming sources})]-0.062(wt \% \text{ kaolin sources})+0.264(wt \% \text{ pore formers})-0.0147[(wt \% \text{ kaolin sources})(wt \% \text{ pore formers})]$, in which HR1 is the heating rate from 1200-1300° C. in ° C./hr and HR2 is the heating rate from 1300-1360° C. in ° C./hr. The weighted average median particle diameter of the talc is not more than 35 μm and the weighted average median particle diameter of the silica-forming sources is not more than 35 μm.

According to embodiments of the present invention, the combination of a total porosity of at least 40% and a $d_{10}$ pore diameter of at least 8 μm produces a high permeability and thereby provides a low pressure drop for the clean filter. Furthermore, the combination of a total porosity less than 54% and a $d_{90}$ pore diameter of not more than 35 μm provides high strength to the honeycomb body, and also provides a high filtration efficiency to the particulate filter. Additionally, the combination of a total porosity of greater than or equal to 40% and a value of $d_f=(d_{50}-d_{10})/d_{50}$ of less than or equal to 0.50 provides a low pressure drop for the diesel particulate filter in a soot-loaded state. This unique combination of properties relating to the pore microstructure thus provides a very desirable combination of low clean pressure drop, low soot-loaded pressure drop, high filtration efficiency, and high strength, and has not been previously demonstrated in the prior art. The narrow pore size distribution provided by the present inventive bodies is especially beneficial when the article is used as a catalyzed diesel particulate filter, because a narrow pore size distribution promotes a more uniform distribution of the catalyst on the surfaces of the pore walls. A more uniform thickness of the catalyst coating on the pore walls provides a low clean and soot-loaded pressure drop, and also provides for greater contact between the catalyst and the soot and the catalyst and the exhaust gas, thereby promoting a more efficient use of the catalyst.

Furthermore, according to many embodiments of the invention, the method for manufacturing the ceramic article either does not require a pore former, or utilizes commercially available pore formers, such as graphite or polymer beads, which, unlike some natural organic pore formers, are readily available in large quantities and are of a controlled and reproducible particle size.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
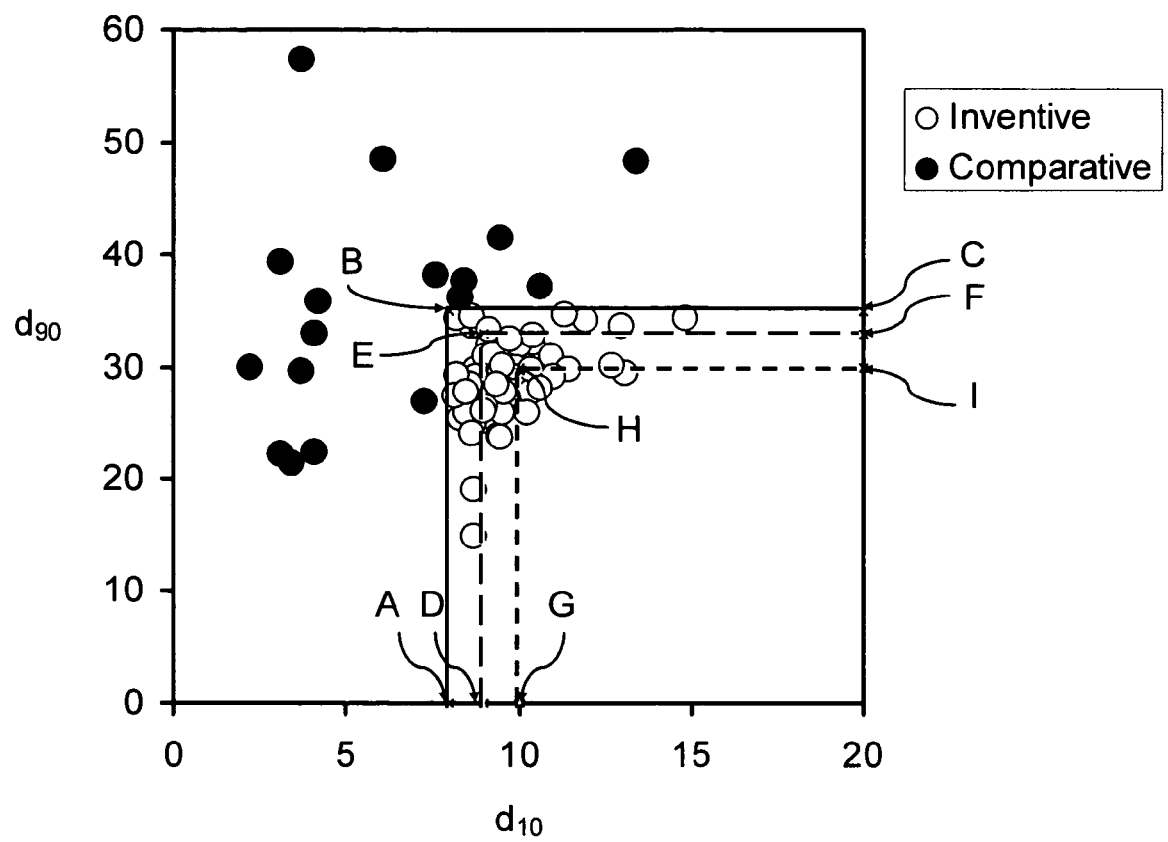
FIG. 1 is a plot of the $d_{90}$ pore diameter versus the $d_{10}$ pore diameter, in microns, for examples of the present invention from Tables 7 to 13, and for comparative examples prepared according to the prior art from Tables 21 to 23.

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "alumina forming source" includes aspects having two or more such alumina forming sources, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of an organic component, unless specifically stated to the contrary, is based on the total weight of the total inorganics in which the component is included. Organics are specified herein as superadditions based upon 100% of the inorganics used.

As referred to herein, particle diameters are based upon a particle volume distribution as measured by laser diffraction on a suspension of the powders in a liquid, such as in water or isopropyl alcohol or a mixture thereof, using a particle size analyzer, such as a Model FRA9200 or Model S3000 Microtrac particle analyzer (products of Microtrac Inc.). Further, a median particle diameter is thus the particle diameter at which 50% of the particles are of a smaller diameter, and 50% are of a larger diameter, based upon cumulative particle volume.

As briefly introduced above, the present invention seeks to provide an improved ceramic honeycomb article useful for ceramic filter applications and exhibits high thermal durability and high filtration efficiency coupled with low pressure drop across the filter. To this end, a pore microstructure is provided in a fired ceramic body that is characterized by a relatively high level of porosity, a relatively narrow pore size distribution, and a relatively low coefficient of thermal expansion (CTE). The narrow pore size distribution provided by the present inventive bodies is especially beneficial when the article is used as a catalyzed diesel particulate filter, because a narrow pore size distribution promotes a more uniform distribution of the catalyst on the surfaces of the pore walls. In particular, a more uniform thickness of the catalyst coating on the pore walls provides a low clean and soot-loaded pressure drop, and also provides for greater contact between the catalyst and the soot and the catalyst and the exhaust gas, thereby promoting a more efficient use of the catalyst.

In accordance therewith, the present invention provides a ceramic honeycomb article, which in one aspect is composed predominately of a crystalline phase cordierite composition. The ceramic honeycomb article possesses a microstructure characterized by a unique combination of relatively high porosity (but not too high) and relatively narrow pore size distribution, both as measured by mercury porosimetry. The ceramic structure is useful for ceramic filter applications requiring high thermal durability and high filtration efficiency coupled with low pressure drop across the filter. Such ceramic articles are particularly well suited for filtration applications, such as diesel exhaust filters or DPFs.

In one aspect, the present invention provides an improved cordierite ceramic article having a novel pore microstructure by virtue of a combination of volume percent porosity and narrow pore size distribution characterized by a total porosity (% P) in the range of greater than or equal to 40% to less than 54%; a $d_{10}$ value of at least 8 μm; a $d_{90}$ value of not more than 35 μm; and a value of $d_f=(d_{50}-d_{10})/d_{50}$ of less than or equal to 0.50. When used as a diesel particulate filter, the inventive pore microstructure provides low clean and soot-loaded pressure drop, high filtration efficiency, and high strength. Specifically, the combination of a porosity of greater than or equal to 40% and a $d_{10}$ pore diameter of at least 8 μm provides a low pressure drop for the clean filter. Furthermore, the combination of a total porosity less than 54% and a $d_{90}$ pore diameter of not more than 35 μm provides high strength to the honeycomb body, and also provides a high filtration efficiency to the particulate filter. Additionally, the combination of a total porosity of greater than or equal to 40%, a $d_{10}$ pore diameter of at least 8 μm, and a value of $d_f=(d_{50}-d_{10})/d_{50}$ of less than or equal to 0.50 provides a low pressure drop for the diesel particulate filter in a soot-loaded state.

The pore size distribution of the inventive cordierite ceramic article is characterized by the pore diameter at which a specified percentage of the total pore volume is of a finer pore diameter. Thus, for example, $d_1$, $d_5$, $d_{10}$, $d_{50}$, $d_{90}$, $d_{95}$, and $d_{99}$ denote the pore diameters at which 1%, 5%, 10%, 50%, 90%, 95%, and 99% of the total pore volume are of a finer pore diameter, respectively. Volume percent porosity and pore size distribution as used herein are measured by mercury porosimetry on specimens from the ceramic article. All pore size distributions are on a pore volume basis. In particular, the parameters $d_{10}$, $d_{50}$ and $d_{90}$ are used herein, among other parameters, to define the relative narrowness of the pore size distribution. The quantity $d_{50}$ is the median pore diameter based upon pore volume, and is measured in μm; thus, $d_{50}$ is the pore diameter at which 50% of the open porosity of the ceramic honeycomb article has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of microns.

Figure 2:
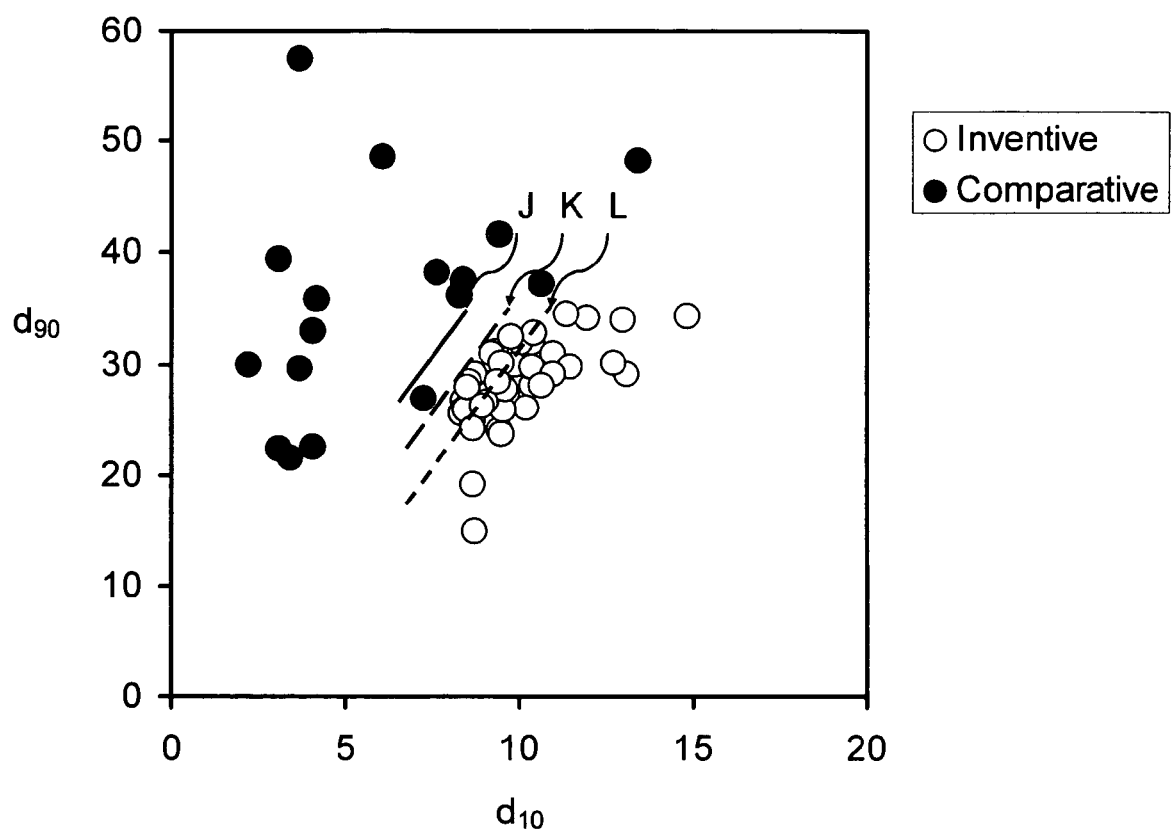
FIG. 2 is a plot of $d_{90}$ versus $d_{10}$, in microns, for certain aspects of the present invention embodied in Tables 7 to 13, and for comparative examples prepared according to the prior art from Tables 21 to 23.

According to another aspect illustrating the narrowness of the pore size distribution of the ceramic article, the pore distribution exhibits $d_{10}$ which is greater than or equal to 8 μm. In still another aspect, $d_{10}$ may be greater than or equal to 9 μm, $d_{10}$ may be greater than or equal to 10 μm, or even greater than or equal to 11 μm. Additionally, $d_{90}$ is preferably less than or equal to 35 μm. In still another aspect, $d_{90}$ may be less than or equal to 33 μm, less than or equal to 32 μm, less than or equal to 30 μm, less than or equal to 27 μm, or even less than or equal to 25 μm. In another aspect, combinations of $d_{10}$ and $d_{90}$ can include a $d_{10}$ greater than or equal to 8 μm and a $d_{90}$ less than or equal to 35 μm; a $d_{10}$ greater than or equal to 9 μm and a $d_{90}$ less than or equal to 33 μm; or even a $d_{10}$ greater than or equal to 10 μm and a $d_{90}$ less than or equal to 30 μm (FIG. 1). As shown, the solid lines (A-B-C), long-dashed lines (D-E-F), and short-dashed lines (G-H-I) delimit regions of inventive combinations of $d_{10} \geq 8$ μm with $d_{90} \leq 35$ μm, $d_{10} \geq 9$ μm with $d_{90} \leq 33$ μm, and $d_{10} \geq 10$ μm with $d_{90} \leq 30$ μm, respectively. Inventive examples are denoted by open circles and comparative examples are indicated by filled circles. Still further, in another aspect, the present invention can provide a cordierite ceramic article for which the values of $d_{10}$ and $d_{90}$ satisfy the relationship $d_{90} \leq 3.6(d_{10})-2.4$, $d_{90} \leq 3.6(d_{10})-7.4$, or even $d_{90} \leq 3.6(d_{10})-12.4$ (FIG. 2). As shown, the solid line (J), long-dashed line (K), and short-dashed line (L) delimit regions of inventive combinations of $d_{90} \leq 3.6(d_{10})-2.4$, $d_{90} \leq 3.6(d_{10})-7.4$, and $d_{90} \leq 3.6(d_{10})-12.4$, respectively, where $d_{10}$ and $d_{90}$ are in microns and where $d_{10} \geq 8$ μm and $d_{90} \leq 35$ μm. Inventive examples are denoted by open circles and comparative examples are indicated by filled circles.

The median pore diameter, $d_{50}$, of the pores present in the instant ceramic articles is, in one aspect, at least 10 μm, at least 12 μm; at least 14 μm; or even at least 16 μm. In another aspect, the median pore diameter, $d_{50}$, is not more than 22 μm; not more than 20 μm, or even not more than 18 μm. In still another aspect, the median pore diameter can be in the range of greater than or equal to 10 μm to less than or equal to 22 μm; greater than or equal to 12 μm to less than or equal to 20 μm; greater than or equal to 14 μm to less than or equal to 17 μm; greater than or equal to 17 μm to less than or equal to 22 μm; or even greater than or equal to 10 μm to less than or equal to 14 μm. These ranges can provide suitable pressure drop properties, relatively high filtration efficiency, and relatively high strength as a particulate filter. Median pore diameters in the range of greater than or equal to 10 μm to less than or equal to 14 μm provide especially high filtration efficiency, while median pore diameters of greater than or equal to 17 μm and less than or equal to 22 μm preserve a low pressure drop for filters with higher loading of catalyst in the pores.

In an additional aspect, the narrow pore size distributions of the inventive ceramic honeycomb articles are evidenced by the width of the distribution of pore sizes finer than the median pore size, $d_{50}$. As used herein, the width of the distribution of pore sizes finer than the median pore size, $d_{50}$, is represented by a so-called "$d_f$" value which expresses the quantity $(d_{50}-d_{10})/d_{50}$. To this end, it has also been discovered that the soot-loaded pressure drop can, in one aspect, be lower when the quantity $d_f$ is of a small value. This can be especially important when the filter has been catalyzed, such as with a metal oxide and/or dispersed metal catalyst, especially when the catalyst is contained largely within the porous wall of the honeycomb. Thus, in another aspect, the value of $d_f$ is less than or equal to 0.45, is less than or equal to 0.40, is less than or equal to 0.35, is less than or equal to 0.33, or even less than or equal to 0.30.

The narrow pore size distribution of the inventive ceramic articles is also evidenced by the width of the distribution of pore sizes that are finer and coarser than the median pore size, $d_{50}$. As used herein, the width of the distribution of pore sizes that are finer and coarser than the median pore size, $d_{50}$, are represented by a "$d_b$" value which expresses the quantity $(d_{90}-d_{10})/d_{50}$. To this end, the ceramic structure of the present invention in one aspect comprises a pore size distribution with a $d_b$ less than or equal to 1.50. In still another aspect, exemplary embodiments of the present invention can exhibit a $d_b$ less than or equal to 1.40; less than or equal to 1.30; less than or equal to 1.20; less than or equal to 1.10; less than or equal to 1.0, or even less than or equal to 0.90.

The total porosity % P of the inventive ceramic body, as measured by mercury porosimetry, is in one aspect is greater than or equal to 40%. In another aspect, the total porosity % P can be greater than or equal to 42%; or even greater than or equal to 45%. The total porosity in another aspect is less than 54%, less than 53%; or even less than 52%. Still further, in another aspect, the total porosity of the ceramic article can be in a range of from greater than or equal to 40% to less than 54%; from greater than or equal to 42% to less than 53%; or even from greater than or equal to 45% to less than 52%. To this end, it should be appreciated that achieving relatively lower porosity while still achieving sufficiently low back pressure across the article is desired in that it provides higher strength.

Another advantage of the inventive articles is a low coefficient of thermal expansion resulting in excellent thermal shock resistance (TSR). TSR is inversely proportional to the coefficient of thermal expansion (CTE). That is, honeycomb ceramic articles with low thermal expansion have good thermal shock resistance and can survive the wide temperature fluctuations that are encountered in end use filter applications. Accordingly, in one aspect, the ceramic articles of the present invention are characterized by having a low coefficient of thermal expansion (CTE), measured by dilatometry, in the axial direction wherein CTE$\leq 10.0 \times 10^{-7}$/° C. across the temperature range of from 25° C. to 800° C. In another aspect, CTE$\leq 8.0 \times 10^{-7}$/° C.; CTE$\leq 6.0 \times 10^{-7}$/° C.; CTE$\leq 5.0 \times 10^{-7}$/° C., or even CTE$\leq 4.0 \times 10^{-7}$/° C. across the temperature range of from 25° C. to 800° C. In several outstanding exemplary embodiments of the invention, CTE$\leq 3.0 \times 10^{-7}$/° C. across the temperature range of from 25° C. to 800° C.

In still another aspect, the ceramic articles of the present invention exhibit combinations of properties including a CTE of less than or equal to $8.0 \times 10^{-7}$/° C. (or even $\leq 7.0 \times 10^{-7}$/° C. from 25° C. to 800° C.), a porosity of greater than or equal to 47% (or even $\geq 49\%$), and a value of $d_{10}$ of at least 9 μm and a value of $d_{90}$ of not more than 33 μm (especially $d_{90} \leq 31$ μm). Other combinations of properties can include a total porosity of greater than or equal to 47% (or even $\geq 48\%$), a value of $d_f$ of less than or equal to 0.45 (or even less than or equal to 0.40), and a CTE of less than or equal to $8.0 \times 10^{-7}$/° C. from 25° C. to 800° C. (or even $\leq 7.0 \times 10^{-7}$/° C. from 25° C. to 800° C.). In still another aspect of the invention, the total porosity may be greater than or equal to 48%, the value of $d_f$ is less than or equal to 0.40, and the CTE is less than or equal to $7.0 \times 10^{-7}$/° C. from 25° C. to 800° C.

Still other aspects of the present invention provide an improved cordierite ceramic article having a porous ceramic composition with a total porosity of greater than or equal to 40% and less than 54%, and a pore size distribution with a $d_{10}$ value of greater than or equal to 8 μm, a $d_{90}$ value of less than or equal to 35 μm, $d_f=(d_{50}-d_{10})/d_{50}$ of less than or equal to 0.50. Additionally, less than 20% of the total pore volume may be comprised of pores having a diameter smaller than 10 μm and wherein less than 15% of the total pore volume is comprised of pores having a diameter larger than 30 μm. In one aspect, it can be preferred that the volume of pores finer than 10 μm is less than 15% of the total pore, and more preferably less than 12%, and even more preferably less than 10%, and still more preferably that less than 8%. In other aspects, the volume of pores larger than 30 μm is less than 12% of the total pore volume, preferably less than 11%, and still more preferably less than 9%. In still other aspects, the percentage of the total porosity that is coarser than 25 μm is less than 20%, more preferably less than 15%, still more preferably less than 12%, and even more preferably less than 10%.

Figure 3:
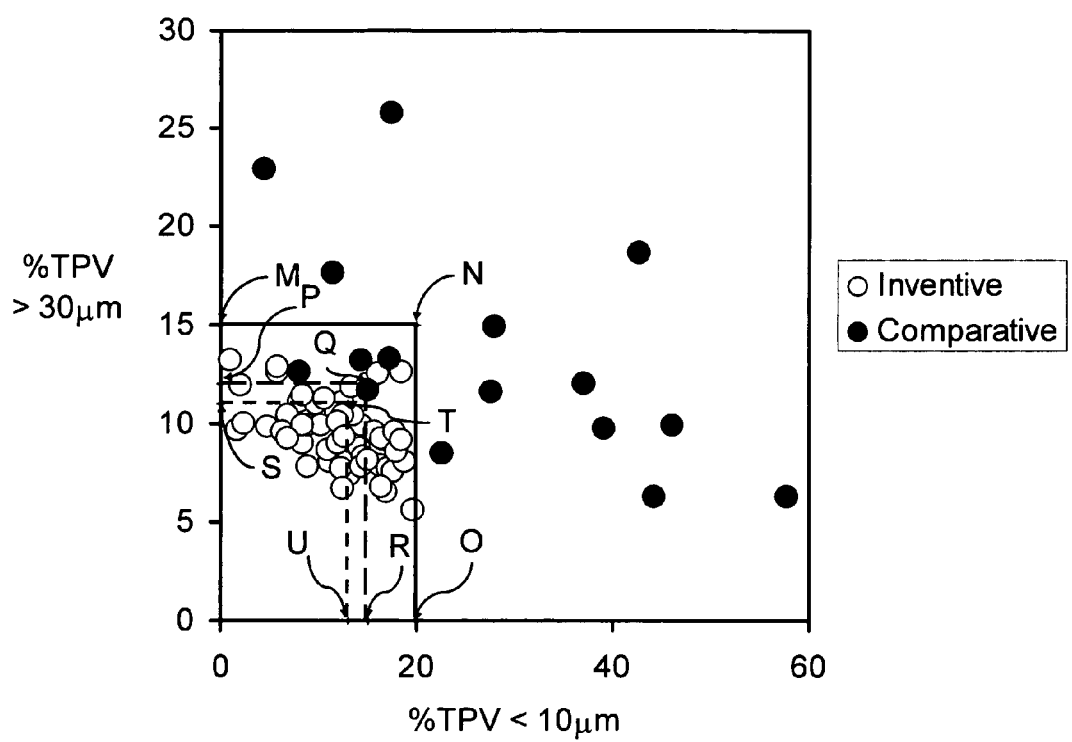
FIG. 3 is a plot of the percentage of the total pore volume (TPV) that is comprised of pores having a diameter larger than 30 μm, % TPV>30 μm, versus the percentage of the total pore volume that is comprised of pores having a diameter smaller than 10 μm, % TPV<10 μm, for some of the embodiments of the present invention from Tables 7 to 13, and for some of the comparative examples prepared according to the prior art from Tables 21 to 23.

Certain inventive cordierite articles exhibit especially desirable combinations of pore size distributions, such as less than 20% of the total pore volume finer than 10 μm and less than 15% of the total pore volume larger than 30 μm, or less than 15% of the total pore volume finer than 10 μm and less than 12% of the total pore volume larger than 30 μm, or less than 13% of the total pore volume finer than 10 µm and less than 11% of the total pore volume larger than 30 µm (FIG. 3). As shown, the solid lines (M-N-O), long-dashed lines (P-Q-R), and short-dashed lines (S-T-U) delimit regions of inventive combinations of less than 15% TPV larger than 30 µm and less than 20% TPV smaller than 10 µm, less than 12% TPV larger than 30 µm and less than 15% TPV smaller than 10 µm, and less than 11% TPV larger than 30 µm and less than 13% TPV smaller than 10 µm, respectively. Inventive examples are denoted by open circles and comparative examples are indicated by filled circles.

Figure 4:
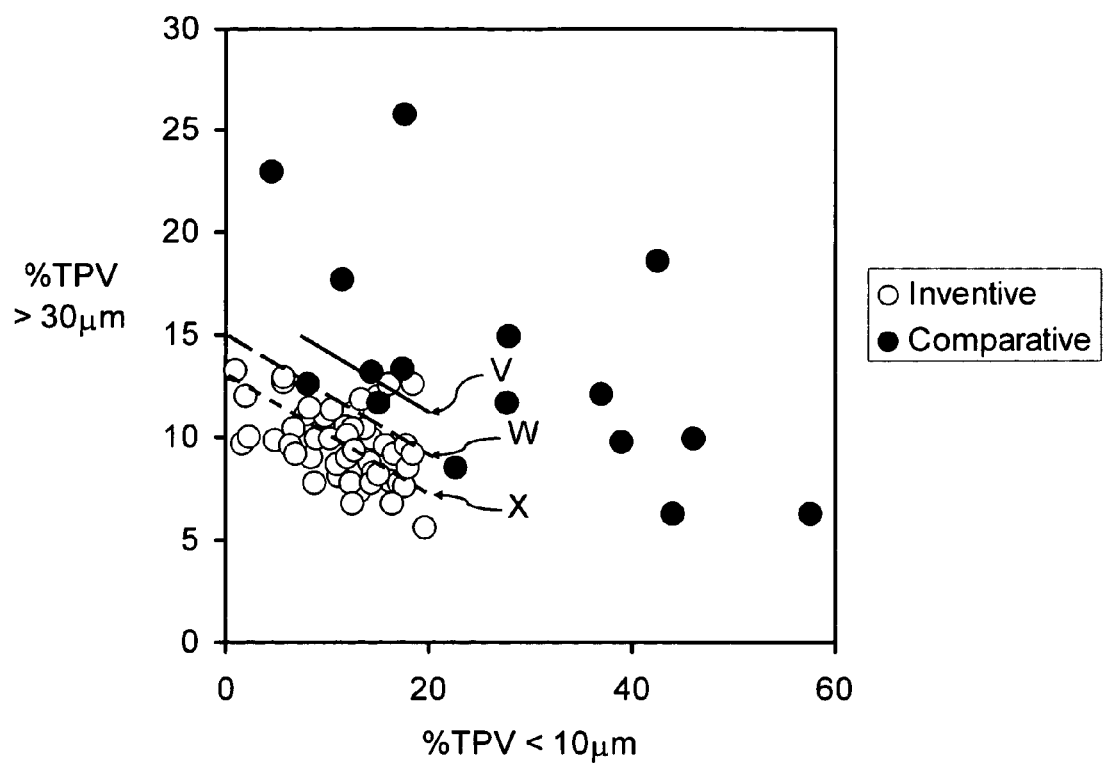
FIG. 4 is a plot of the percentage of the total pore volume (TPV) that is comprised of pores having a diameter larger than 30 μm, % TPV>30 μm, versus the percentage of the total pore volume that is comprised of pores having a diameter smaller than 10 μm, % TPV<10 μm, for certain aspects of the embodiments of the present invention from Tables 7 to 13, and for some of the comparative examples prepared according to the prior art from Tables 21 to 23.

According to further aspects, the percentage of the total pore volume comprised of pores with diameters larger than 30 µm is less than the quantity defined by 17−0.3(% TPV<10 µm), and more preferably less than 15−0.3(% TPV<10 µm), and still more preferably less than 13−0.3(% TPV<10 µm) (FIG. 4). As shown, the solid line (V), long-dashed line (W), and short-dashed line (X) delimit regions of the inventive combinations where % TPV (<30 µm)<[17−0.3(% TPV<10 µm)], % TPV(<30 µm)<[15−0.3(% TPV<10 µm)], and % TPV(<30 µm)<[13−0.3(% TPV<10 µm)], respectively. Inventive examples are denoted by open circles and comparative examples are indicated by filled circles.

The percentage of the total pore volume comprised of pores having diameters between 10 and 30 µm is preferably at least 70%, more preferably at least 75%, still more preferably at least 80%, and even more preferably at least 85%, as this provides especially low soot-loaded pressure drop.

Additional combinations of properties can also include a CTE of less than or equal to $8.0 \times 10^{-7}/°C$. across the temperature range from 25° C. to 800° C., a total porosity of greater than or equal to 47%, and in which not less than 75% of the total pore volume is comprised of pores having diameters between 10 µm and 30 µm. In another aspect, the CTE of less than or equal to $7.0 \times 10^{-7}/°C$., the total porosity is greater than or equal to 48%, and not less than 80% of the total pore volume is comprised of pores having diameters between 10 µm and 30 µm.

As one of skill in the art will appreciate, the ratio of the strength (MOR) to elastic modulus (E) of a material represents the strain tolerance of that material. In another aspect, the inventive ceramic articles further preferably exhibit a ratio of modulus of rupture to elastic modulus, MOR/E, as measured at room temperature, of at least 0.06%, at least 0.07%, or even at least 0.08%.

Figure 5:
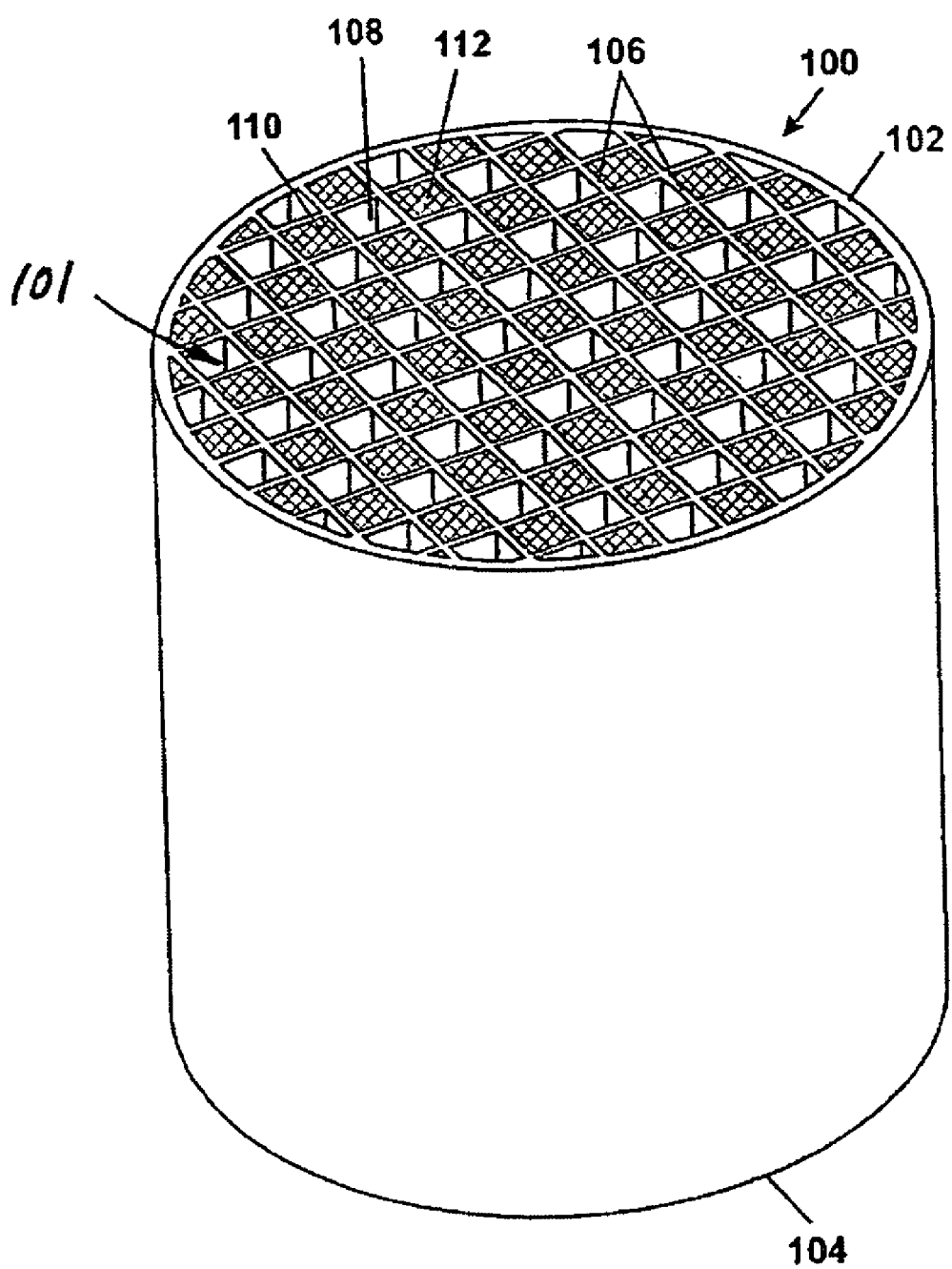
FIG. 5 is a perspective view of a ceramic honeycomb article according to the present invention.

The ceramic articles of the present invention can have any shape or geometry suitable for a particular application. In high temperature filtration applications, such as diesel particulate filtration, for which the inventive articles are especially suited, it can be preferred for the articles to have a multicellular structure, such as that of a honeycomb monolith shown in FIG. 5.

The honeycomb article 100 preferably has an inlet 102 and outlet end 104, and a multiplicity of cells 108, 110 extending from the inlet end to the outlet end, the cells formed from intersecting porous walls 106. The inventive articles 100 may have a cellular density from about 70 cells/in² (10.9 cells/cm²) to about 400 cells/in² (62 cells/cm²). When the article is a filter, preferably a portion of the cells 110 at the inlet end 102 are plugged with a paste having same or similar composition to that of the body 101, as described in U.S. Pat. No. 4,329,162. The plugging is preferably performed only at the ends of the cells and form plugs 112 typically having a depth of about 5 to 20 mm, although this can vary. A portion of the cells on the outlet end 104 but not corresponding to those on the inlet end 102 may also be plugged in a similar pattern. Therefore, each cell is preferably plugged only at one end. A preferred arrangement is to have every other cell on a given face plugged as in a checkered pattern as further shown in FIG. 5.

This plugging configuration allows for more intimate contact between the exhaust stream and the porous walls of the filter. The exhaust stream flows into the filter through the open cells at the inlet end 102, then through the porous cell walls 106, and out of the body 101 through the open cells at the outlet end 104. Filters 100 of the type herein described are known as "wall flow" filters since the flow paths resulting from alternate channel plugging require the exhaust being treated to flow through the porous ceramic cell walls prior to exiting the filter.

Cordierite diesel particulate filters having lower pressure drop, in combination with high filtration efficiency, as well as improved strength have been obtained relative to cordierite filters of the prior art. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

The pressure drop increase at a given loading of soot (in grams/liter) depends upon the geometry of the filter, the permeability of the ceramic wall, and the permeability of the accumulated soot layer. Geometric factors that influence pressure drop include the length and diameter of the filter, the depth of the plugs at the ends of the filter, the number of cells per unit area, and the thickness of the walls. The permeability of the clean ceramic wall, prior to soot loading, is controlled by the porosity, median pore diameter, pore size distribution (as characterized by the % of large and small pores, the $d_f$, and $d_b$ for example), and pore connectivity. Furthermore, during the initial stages of soot loading, some of the soot enters into the pores on the surface of the ceramic wall. This reduces the permeability of the wall compared to the permeability of the clean wall prior to the deposition of any soot. This reduction in permeability increases the pressure drop through the filter. It has been found that the reduction in the permeability of the wall containing the soot, is also influenced by the porosity, pore size distribution and pore connectivity of the ceramic comprising the wall. Thus, the porosity, pore size distribution and pore connectivity influence the pressure drop of the clean and soot-loaded filter, which, in turn, affects the fuel economy and efficiency of the diesel engine.

In addition to lower pressure drop, other advantages of the present invention include high filtration efficiencies, and improved strength relative to higher porosity filtering articles. This is due to the unique combination of porosity and pore size distribution described above.

The invention also provides a method for fabricating the inventive cordierite articles described above. Accordingly, the method of the present invention generally comprises first providing a plasticized ceramic precursor batch composition comprising inorganic ceramic forming batch component(s), a liquid vehicle, optional pore former, and a binder. A green body having a desired shape can then be formed from the plasticized ceramic precursor batch composition. The formed green body can then be fired under conditions effective to convert the green body into a ceramic article containing cordierite.

The inorganic batch components are selected from a talc source; an alumina-forming source; a kaolin source; and a silica-forming source. In one aspect, the batch components are further selected so as to yield a ceramic article comprising cordierite, mullite, spinel, or a mixture thereof upon firing. For example, and without limitation, in one aspect, the inorganic batch components can be selected to provide a ceramic article which comprises at least about 93% by weight cordierite, the article consisting essentially of, as characterized in an oxide weight percent basis, from about 49 to about 53 percent by weight $SiO_2$, from about 33 to about 38 percent by weight $Al_2O_3$, and from about 12 to about 16 percent by weight MgO.

In one aspect, suitable talcs can comprise talc having a mean particle size of at least about 5 μm, at least about 8 μm, at least about 12 μm, or even at least about 15 μm. Particle size is measured by a laser diffraction technique, such as by a Microtrac Particle Size Analyzer. In another aspect, the talc can have a particle size in the range of from 15 to 25 μm. In still a further aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possess a morphology index in the range of from 0.50 to 1.0, including morphology index values greater than about 0.50, 0.60, 0.70, 0.80, 0.85, or even 0.90. The talc morphology index can be measured by x-ray diffractometry (XRD) on a talc powder that is packed into the x-ray diffraction sample holder to maximize the orientation of the talc within the plane of the sample holder, as described in U.S. Pat. No. 5,258,150. The XRD talc morphology index, M, is defined by the relationship:

$$M = I(004)/[I(004) + I(020)] \quad \text{EQ. 1}$$

where I(004) and I(020) are the x-ray intensities of the (004) and (020) reflections as measured by Cu Kα radiation. The value of the XRD talc morphology index is proportional to the aspect ratio, or platy character, of the talc particles. To this end, talc with a platy particle shape promotes the growth of cordierite crystals with their negative-expansion c-axes in the plane of the wall, thereby lowering CTE in the axial and radial directions of the honeycomb article.

The talc and/or calcined talc are in one aspect preferably provided in an amount of between 38 and 42 wt. % of the total inorganic materials. To that end, the talc or calcined talc sources can in another aspect have a weighted average median particle diameter greater than about 7 μm, preferably greater than about 15 μm, more preferably greater than about 20 μm, but preferably have a median particle diameter less than 30 μm. The weighted average median particle diameter of the talc sources is defined as:

$$d_{50}(\text{talc sources}) = \frac{(W_{Tc-1})(d_{50,Tc-1}) + (W_{Tc-2})(d_{50,Tc-2}) + \ldots + (W_{Tc-n})(d_{50,Tc-n})}{(W_{Tc-1}) + (W_{Tc-2}) + \ldots + (W_{Tc-n})} \quad \text{EQ. 2}$$

where W is the weight percentage of each talc source and calcined talc source in the batch composition, $d_{50}$ is the median particle diameter of each talc and calcined talc source, and Tc-1, Tc-2, ... Tc-n represent each talc and calcined talc source used in the mixture. It is further preferred that <1% of the talc particles are >50 μm.

Alumina-forming sources are compounds capable of forming $Al_2O_3$ upon heating. Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, having a particle size of between about 4-10 micrometers, and a surface area of about 0.5-1 $m^2$/g, and relatively fine aluminas having a particle size of between about 0.5-2 micrometers, and a surface area of about 8-11 $m^2$/g.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 $m^2$/g. Alternatively, a dispersible alumina source can have a specific surface area of at least 50 $m^2$/g. Still further, a dispersible alumina forming source can exhibit a dispersed median particle diameter of less than 1 μm, preferably less than 0.5 μm, and more preferably less than 0.2 μm, which preferably comprises not more than 10 wt. % of the inorganic raw materials.

In an exemplary aspect, a suitable dispersible alumina source for use in the methods of the instant invention comprises alpha aluminum oxide hydroxide ($AlOOH \cdot xH_2O$) commonly referred to as boehmite, pseudoboehmite, and as aluminum monohydrate. In still another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

In one aspect of the present invention, the alumina-forming source is preferably present in an amount of about 34 to 38 wt. %. Further, the weighted average of the median particle diameters of the alumina-forming sources preferably is at least 4 μm, and in some embodiments at least 6 μm, and more preferably at least 8 μm. The weighted average of the median particle diameters of the alumina-forming sources is defined as:

$$d_{50}(Al_2O_3\text{-forming sources}) = \frac{(W_{Al-1})(d_{50,Al-1}) + (W_{Al-2})(d_{50,Al-2}) + \ldots + (W_{Al-n})(d_{50,Al-n})}{(W_{Al-1}) + (W_{Al-2}) + \ldots + (W_{Al-n})} \quad \text{EQ. 3}$$

where W is the weight percentage of each alumina-forming source in the batch composition, $d_{50}$ is the median particle diameter of each alumina-forming source, and Al-1, Al-2, ... Al-n represent each alumina-forming source used in the mixture.

The kaolin source can comprise clay or mixtures of clays, such as for example, raw kaolin, calcined kaolin, and/or mixtures thereof. Exemplary and non-limiting clays include non-delaminated kaolinite raw clay having a particle size of about 8-13 micrometers, delaminated kaolinite having a particle size of about 2-5 micrometers, and calcined clay having a particle size of about 1-4 micrometers. The kaolin or calcined kaolin source, when present in the batch composition, preferably has a median particle diameter of between 1 and 15 μm, more preferably between 3 and 12 μm.

The silica-forming source includes, but is not limited to, crystalline silica, such as quartz or cristobalite; cryptocrystalline silica; non-crystalline silica such as fused silica or colloidal silica; a low-alumina substantially alkali-free zeolite; diatomaceous silica; and combinations thereof. Further, in still another aspect, the silica-forming source can comprise a compound that forms free silica when heated, such as for example, silicic acid or a silicon organo-metallic compound. In one aspect, quartz, cryptocrystalline silica, or fused silica are preferred.

The silica-forming source is preferably present in the amount of between 10 and 24 wt. % and preferably has a weighted average median particle diameter of at least 10 μm; and more preferably at least 20 microns. Most preferably the silica source has a median particle diameter of less than 30 μm. The weighted average of the median particle diameters of the silica-forming sources is defined as:

$$d_{50}(\text{silica-forming sources}) = \frac{(W_{Si-1})(d_{50,Si-1}) + (W_{Si-2})(d_{50,Si-2}) + \ldots + (W_{Si-n})(d_{50,Si-n})}{(W_{Si-1}) + (W_{Si-2}) + \ldots + (W_{Si-n})} \quad \text{EQ. 4}$$

where W is the weight percentage of each silica-forming source in the batch composition, $d_{50}$ is the median particle diameter of each silica-forming source, and Si-1, Si-2, ... Si-n represent each silica-forming source used in the mixture. It is further preferred that <1% of the silica-forming particles are >50 μm.

In still another aspect, it can be preferred that the talc and silica-forming sources taken together have a weighted average median particle diameter of at least 7 μm, and preferably at least 10 μm, and more preferably at least 20 μm, wherein the weighted average median particle diameter of the talc+silica-forming source, $d_{50}(TS)$ is defined as:

$$d_{50}(TS) = \frac{(W_{Tc-1})(d_{50,Tc-1}) + (W_{Tc-2})(d_{50,Tc-2}) + \ldots + (W_{Si-1})(d_{50,Si-1}) + (W_{Si-2})(d_{50,Si-2}) + \ldots}{(W_{Tc-1}) + (W_{Tc-2}) + \ldots + (W_{Si-1}) + (W_{Si-2}) + \ldots} \quad \text{EQ. 5}$$

where W is the weight percentage of each talc, calcined talc, and silica-forming source in the batch composition, $d_{50}$ is the median particle diameter of each talc, calcined talc, and silica-forming source, and Tc-1, Tc-2, ... Si-1, Si-2, ... represent each talc, calcined talc, and silica-forming source used in the mixture.

As set forth above, the plasticized ceramic precursor batch composition can optionally comprise an organic pore former. As will be appreciated by one of ordinary skill in the art, the pore former is a fugitive material which evaporates or undergoes vaporization by combustion during drying or heating of the green body to obtain a desired, larger porosity and/or coarser median pore diameter than would otherwise be obtained. According to one aspect of the present invention, it has been discovered that the use of certain pore formers enables the manufacture of ceramic articles possessing the unique combination of microstructure and physical properties described above. Exemplary pore forming agents include without limitation, graphite, polymeric powders, wood four, nut shell flour, and the like. In one aspect a ceramic article having the aforementioned microstructure can be achieved from a ceramic precursor batch composition which comprises a graphite pore former.

The pore forming agent, when used, is generally present only in an amount effective to provide a desired porosity in the resulting fired ceramic article. For example, in one aspect, a ceramic article of the presenting invention can be manufactured from a precursor batch composition comprising a pore former in an amount less than about 30 percent by weight calculated as superaddition relative to the inorganic batch forming components, including amounts less than 25%, 20% or even less than 15%. Still further, the weighted average median particle diameter of the pore formers, $d_{50}(PF)$, when a pore former is provided, is preferably at least 15 μm and not more than 80 μm, and more preferably at least 20 μm and not more than 50 μm, where $d_{50}(PF)$ is defined as $$d_{50}(PF) = \frac{(W_{PF-1})(d_{50,PF-1}) + (W_{PF-2})(d_{50,PF-2}) + \ldots + (W_{PF-n})(d_{50,PF-n})}{(W_{PF-1}) + (W_{PF-2}) + \ldots + (W_{PF-n})} \quad \text{EQ. 6}$$

where W is the weight percent super-addition of each pore former in the batch composition as defined above, $d_{50}$ is the median particle diameter of each pore former, and PF-1, PF-2, ... PF-n represent each pore former used in the mixture.

The inorganic batch components and the optional pore former agent can be intimately blended with a liquid vehicle and forming aids which impart plastic formability and green strength to the raw materials when they are shaped into a body. Forming may be done by, for example, molding or extrusion. When forming is done by extrusion, most typically a cellulose ether binder such as methylcellulose, hydroxypropyl methylcellulose, methylcellulose derivatives, and/or any combinations thereof, serve as a binder, and sodium stearate or oleic acid serves as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 2% by weight sodium stearate or oleic acid, and preferably about 1.0% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. Typically, the liquid vehicle content is usually in the range of from 20% to 50% by weight of the plasticized composition. In one aspect, the liquid vehicle component can comprise water.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic articles are in one aspect especially suited for use as diesel particulate filters. Specifically, the inventive ceramic articles are especially suited as multi-cellular honeycomb articles having a high filter volumetric heat capacity, a low pressure drop between the entrance and exit faces of the filter, a low CTE, and high filtration efficiency. To this end, in one aspect the plasticized ceramic precursor batch composition can be formed or otherwise shaped into a honeycomb configuration. Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like a "dog-legged shape," or the like. In addition, the shape of through holes is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The formed green body having a desired size and shape as described above can then be dried to remove excess moisture therefrom. The drying step can be performed by hot air, microwave, steam, or dielectric drying, or combinations and may be followed by ambient air drying. Once dried, the green body can thereafter be fired under conditions effective to convert the green body into a ceramic article comprising a primary crystalline phase ceramic composition as described below.

The firing conditions effective to convert the green body into a ceramic honeycomb article can vary depending on the process conditions such as, for example, the specific composition, size of the green body, and nature of the equipment used. To that end, in one aspect, the optimal firing conditions specified herein may need to be adapted for very large cordierite structures, i.e., slowed down, for example. However, in one aspect, for plasticized mixtures that are primarily for forming cordierite, the firing conditions comprise heating the green body to a maximum soak temperature of between about 1350° C. to about 1450° C. In still another aspect, the green body can be fired at a soak temperature in the range of from about 1390° C. to about 1440° C. In still yet another aspect, the green body may be fired at a soak temperature in the range of from about 1410° C. to about 1435° C., including a preferred soak temperature of, for example, between about 1420° C. and about 1430° C.

The firing times can also range from approximately 40 to 250 hours, during which a maximum soak temperature can be reached and held for a soak time in the range of from about 5 hours to about 50 hours, more preferably between about 10 hours to about 40 hours. In still another aspect, the soak time may be in the range of from about 15 hours to about 30 hours. A preferred firing schedule includes firing at a soak temperature of between about 1415° C. and 1435° C. for between about 10 hours to about 35 hours.

In still another aspect, the method comprises raw materials and firing conditions that satisfy the relationship of $P_{10} \geq 18.5, 19.0, 20.0$ or even $21.0$, where $P_{10}$ is defined by the following equation:

$$P_{10} = 3.503[\log_{10}(HR1)] + 3.106[\log_{10}(HR2)] + 0.00446[(\text{wt \% talc sources})(d_{50}\text{talc sources})] + 0.00497[(\text{wt \% silica-forming sources})(d_{50}\text{silica-forming sources})] + 0.00857[(\text{wt \% alumina-forming sources})(d_{50}\text{alumina-forming sources})] - 0.062(\text{wt \% kaolin sources}) + 0.264(\text{wt \% pore formers}) - 0.0147[(\text{wt \% kaolin sources})(\text{wt \% pore formers})]$$
EQ. 7 and wherein the weighted average of the median particle diameters of the talc sources is not more than 35 μm and the weighted average of the median particle diameters of the silica-forming sources is not more than 35 μm.

In EQ. 7, HR1 is the heating rate from 1200-1300° C. in ° C./hr; HR2 is the heating rate from 1300-1360° C. in ° C./hr; "wt % talc sources" is the sum of the weight percentages of talc and calcined talc in the inorganic batch composition; "$d_{50}$ talc sources" is the weighted average of the median particle diameters of the talc and calcined talc in the mixture; "wt % silica-forming sources" is the sum of the weight percentages of the silica-forming sources in the inorganic batch composition; "$d_{50}$ silica-forming sources" is the weighted average of the median particle diameters of the silica-forming sources; "wt % alumina-forming sources" is the sum of the weight percentages of the alumina-forming sources in the inorganic batch composition; "$d_{50}$ alumina-forming sources" is the weighted average of the median particle diameters of the alumina-forming sources; "wt % kaolin sources" is the weight percentage of the kaolin and calcined kaolin sources in the inorganic batch composition; and "wt % pore formers" is the parts by weight of pore forming agent(s) per 100 parts by weight of inorganic raw materials. A weight percentage computed in this way is referred to as a "superaddition." Thus, for example, "20 wt % pore former" means that 20 grams of pore forming agent is added per 100 grams of inorganic cordierite-forming raw materials. All median particle diameters are in units of microns.

Figure 6:
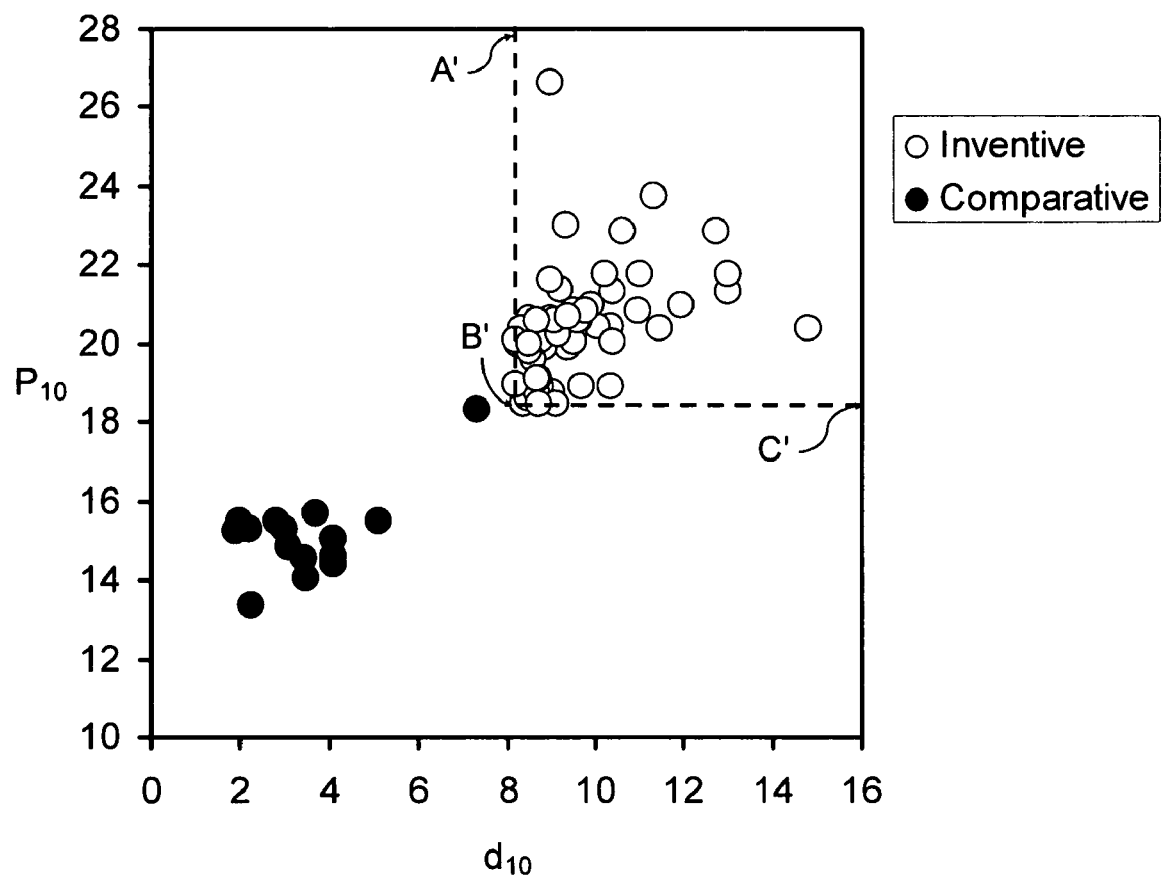
FIG. 6 is a plot of the value of the $P_{10}$ parameter computed from the data for the examples in Tables 7 to 13 and 21 to 23, using EQ. 7, versus the measured value of the $d_{10}$ pore diameter (in microns) for inventive examples and for comparative examples having a $d_{90}$ pore diameter $\leq 35$ μm.

It has been discovered that when the value of $P_{10}$ is at least 18.5, the value of $d_{10}$ for the cordierite ceramic article is at least 8 μm, as desired for high permeability and low pressure drop when the article is used as a particulate filter. This relationship between $P_{10}$ and $d_{10}$ is shown in FIG. 6. As shown, the region delimited by the line A'-B'-C' encompasses the present inventive combinations of $P_{10} \geq 18.5$ and $d_{10} \geq 8$ μm. Inventive examples are denoted by open circles and comparative examples are indicated by filled circles.

Thus, with reference to EQ. 7, it will be apparent that larger values of $P_{10}$, and thus $d_{10}$, are favored when the 1200-1300° C. and 1300-1360° C. heating rates (HR1 and HR2) are large (fast heating), when the median particle diameters of the talc, silica-forming sources, and alumina-forming sources are large, the wt % kaolin sources is low (preferably zero), and when the batch composition contains pore former. The final term in EQ. 7 shows that the rate of increase in $P_{10}$ and $d_{10}$ with added pore former is not as great when kaolin is present in the mixture.

It has also been discovered that combinations of certain raw materials and heating rates can also provide for a low coefficient of thermal expansion. A low coefficient of thermal expansion is desired for high thermal shock resistance. Specifically, according to a preferred method of the invention, the raw materials and firing conditions are selected such that the maximum soak temperature is $\geq 1360°$ C. and the value of the parameter "$P_C$" is less than 10.0, less than 9.0, less than 8.0, less than 7.0, less than 6.0 or even less than 5.0, where "$P_C$" is defined by the following equation:

$$P_c = 1.872(HR2) - 0.00128(HR2)(T_{max}) - 0.00230(HR2)(\text{wt \% kaolin}) + 0.0197(\text{wt \% kaolin})(d_{50}\text{kaolin}) -$$

$$0.0939(\text{Hold Time}) + 0.0420(\text{wt \% } \alpha\text{-alumina})$$
$$(d_{50}\alpha\text{-alumina}) + 0.0103(\text{wt \% hydrated alumina})$$
$$(d_{50} \text{ hydrated alumina}) + 0.207(\text{wt \% pore}$$
$$\text{former}) - 0.00146(\text{\% pore former})(d_{50}\text{pore}$$
$$\text{former}) \qquad \text{EQ. 8}$$

In EQ. 8, "HR2" is the heating rate from 1300 to 1360° C. in ° C./hr; "$T_{max}$" is the maximum firing temperature ("soak temperature") in ° C.; "Hold Time" is the time held at maximum temperature in hours; "wt % $\alpha$-alumina" is the weight percentage of $\alpha$-alumina, also known as corundum, in the inorganic batch composition; "wt % kaolin" includes all kaolin and calcined kaolin sources; and "wt % hydrated alumina" includes all aluminum hydroxide and transition alumina sources, such as $Al(OH)_3$ (gibbsite), boehmite, diaspore, and transition aluminas such as gamma-alumina and rho-alumina, and all particle sizes are in microns.

Figure 7:
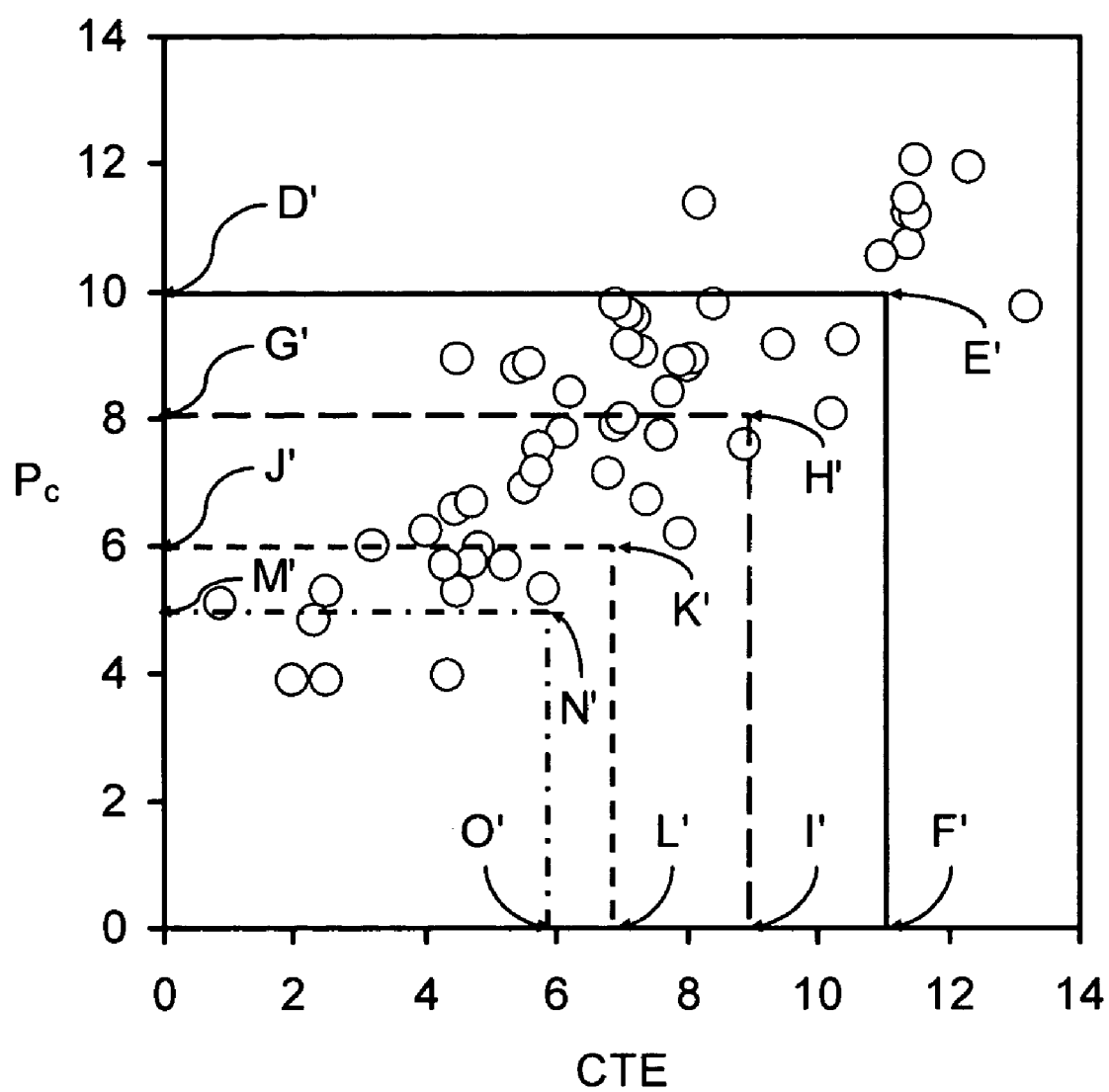
FIG. 7 is a plot of the computed value of the $P_c$ parameter computed from the data for the examples in Tables 7 to 13 using EQ. 8 versus the measured mean CTE in the axial direction of the honeycomb from 25-800° C. ($10^{-7}$/° C.) for the inventive examples.

EQ. 8 defines the relationship among the raw materials and firing conditions that influence CTE for the examples of the present invention and prepared by the inventive method. It has been found that the higher the value of $P_c$, the larger the value of CTE, as shown in FIG. 7. More specifically, the rate at which $P_c$ changes with each variable in EQ. 8 is approximately equal to the rate at which CTE changes with that variable, where CTE is expressed in units of $10^{-7}/°$ C. Thus, the first term in EQ. 8 defines the rate at which CTE increases with increasing heating rate from 1300 to 1360° C. The dependence of CTE on HR2 is also influenced by $T_{max}$ and wt % kaolin, as expressed by the second and third terms in EQ. 8. Thus, the rate at which CTE increases with increasing heating rate from 1300 to 1360° C. is reduced when the maximum firing temperature is increased and/or when the amount of kaolin in the batch is increased. The fourth term in EQ. 8 shows that the benefit of using kaolin to reduce CTE is less effective when the kaolin is of a coarse particle size. The fifth term in EQ. 8 shows that CTE decreases with increasing hold time at $T_{max}$. The sixth and seventh terms in EQ. 8 indicate that CTE increases with the amounts of $\alpha$-alumina and hydrated alumina (including transitional aluminas, etc.) in the batch, and that the rate of CTE increase is greater when the alumina sources are of a coarser particle size. However, the smaller value of the coefficient of the term involving hydrated alumina (0.0103) relative to that for $\alpha$-alumina (0.0420) shows that the increase in CTE is approximately four times less when the alumina-forming source is provided as a hydrated alumina than when it is provided as an $\alpha$-alumina. Finally, EQ. 8 shows that CTE increases with increasing amount of pore former, but the increase is not as great when the pore former is of a coarse particle size.

According to one exemplary aspect of the inventive method, a batch composition is prepared containing 38 to 42 wt. % of a talc or calcined talc with a median particle diameter of 20 to 30 µm and a talc morphology index of at least 0.85, from 6 to 18 wt. % of a kaolin or calcined kaolin having a median particle diameter of 2 to 5 µm, 12 to 20 wt. % of an alpha-alumina having a median particle diameter of 5 to 8 µm, 12 to 20 wt. % of an aluminum hydroxide having a median particle diameter of 10 to 15 µm, 10 to 20 wt. % of a silica-forming source having a median particle diameter of 20 to 30 µm, 5 to 20 wt. % of a graphite pore former having a median particle diameter of 20 to 60 µm, and optionally up to 7% of a highly dispersible boehmite; mixing the raw materials with a binder, lubricant, and water; plasticizing and extruding the mixture into a honeycomb article; drying the honeycomb article; and firing the honeycomb article at a rate of at least 40° C./hr (and preferably at least 100° C./hr) from 1200 to 1300° C., and at a rate of at least 40° C./hr from 1300 to 1360° C., and holding for 10 to 30 hours at a maximum temperature of 1410 to 1430° C.

According to another exemplary aspect of the inventive method, a batch composition is prepared absent of kaolin or calcined kaolin and containing from 38 to 42 wt % of a talc or calcined talc with a median particle diameter of 20 to 30 µm and a talc morphology index of at least 0.85, 20 to 23 wt. % of an alpha-alumina having a median particle diameter of 5 to 8 µm, 8 to 18 wt. % of an aluminum hydroxide having a median particle diameter of 3 to 7 µm, 18 to 24 wt. % of a silica-forming source having a median particle diameter of 20 to 30 µm, 0 to 20 wt. % of a graphite pore former having a median particle diameter of 20 to 60 µm, and optionally up to 7% of a highly dispersible boehmite; mixing the raw materials with a binder, lubricant, and water; plasticizing and extruding the mixture into a honeycomb article; drying the honeycomb article; and firing the honeycomb article at a rate of at least 20° C./hr (and preferably at least 50° C./hr, and more preferably at least 100° C./hr) from 1200 to 1300° C., at a rate of not more than 30° C./hr (and preferably not more than 10° C./hr) from 1300 to 1360° C., and holding at a maximum temperature of 1410 to 1430° C. for 10 to 30 hours. The maximum temperature is preferably 1425 to 1430° C. The heating rate from 1360 to the maximum temperature is preferably not more than 25° C./hr.

According to still another exemplary aspect of the present inventive method, a batch composition is prepared absent of kaolin or calcined kaolin and containing from 38 to 42 wt % of a talc or calcined talc with a median particle diameter of 6 to 12 µm, 20 to 23 wt. % of an alpha-alumina having a median particle diameter of 5 to 8 µm, 8 to 18 wt. % of an aluminum hydroxide having a median particle diameter of 10 to 15 µm, 18 to 24 wt. % of a silica-forming source having a median particle diameter of 3 to 6 µm, 0 to 20 wt. % of a graphite pore former having a median particle diameter of 10 to 40 mm, and optionally up to 7% of a highly dispersible boehmite; mixing the raw materials with a binder, lubricant, and water; plasticizing and extruding the mixture into a honeycomb article; drying the honeycomb article; and firing the honeycomb article at a rate of at least 50° C./hr (and preferably at least 1° C./hr) from 1200 to 1300° C., and holding at a maximum temperature of 1420 to 1430° C. for 15 to 30 hours to yield a body having a value of $d_f$ of not more than 0.35 and a $d_b$ of not more than 1.0.

EXAMPLES

To further illustrate the principles of the present invention, the following examples are put forth so as to provide those of ordinary skill in the art with a complete disclosure and description of how the ceramic articles and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

Examples of the present invention, and comparative examples, are provided in Tables 1 to 23 below. These examples are intended to illustrate the present invention without limiting the invention to the specific examples. In preparing the examples, inorganic raw materials and, optionally, pore formers, were mixed with 4% to 6% methylcellulose binder and 0.5 to 1% of a sodium stearate lubricant, and water added in a stainless steel muller to form a plasticized batch. The batch was extruded as 2-inch and 5.66-inch diameter honeycomb having approximately 200 to 300 cells/inch$^2$ and approximately 0.012 to 0.020-inch walls. The extruded ware was dried and then fired in a gas or electric kiln. Specific aspects of the firing cycle that affect the physical properties of the fired cordierite ceramic are provided in the Tables.

Tables 1 to 3 provide the raw material combinations used in the inventive examples, and Tables 4 to 6 list the compositions used for the comparative examples. Median particle diameters of the raw materials (measured by laser diffraction using a Microtrac particle analyzer) are given in parentheses, and talc morphology indices, where measured, are given in square brackets. In each of the Tables the batch materials are described in percent by weight solids without regard to liquid processing aids such as water and binder materials.

Tables 7 to 13 provide examples according to the present invention and Tables 21 to 23 provide comparative (non-inventive) examples prepared according to the prior art. Tables 14 to 20 provide the total pore volume and further details of the pore size distribution for the inventive examples. The "Firing Temperature" is the maximum temperature at which the samples were held. The "Hold Time" is the duration for which the samples were held at the maximum temperature. Heating rates at temperature ranges other than those specified in the Tables were sufficient to prevent cracking of the ware and are well know in the art. The weighted average median particle diameters of the alumina-forming sources, the talc sources, the silica-forming sources, and the combined talc and silica-forming sources are also provided, as are the weight percentages of pore former and kaolin sources. The term "Kaolin Sources" includes both kaolin and calcined kaolin.

In the Tables, CTE is the mean coefficient of thermal expansion from 25 to 800° C. in units of $10^{-7}/°$ C. as measured by dilatometry on a specimen parallel to the lengths of the channels of the honeycomb article ("axial direction"). The % porosity is the volume percentage of porosity in the walls of the article as measured by mercury porosimetry. The terms $d_1$, $d_5$, $d_{10}$, $d_{50}$, $d_{90}$, $d_{95}$, and $d_{99}$ denote the pore diameters, in microns, or micrometers ($10^{-6}$ meters), at which 1%, 5%, 10%, 50%, 90%, 95%, and 99% of the total pore volume are of a finer pore diameter, respectively, also as measured by mercury porosimetry. Thus, for example, $d_{90}$ is the pore diameter at which 90% (by volume) of the pores have a smaller diameter (equal to the pore diameter at which the cumulative mercury intrusion volume equals 10% of the total mercury intrusion volume).

The quantity $I_A$ is the axial XRD I-ratio (I-ratio measured on the axial cross section of the honeycomb) and $I_T$ is the transverse XRD I-ratio (I-ratio measured on the transverse, as-fired wall surface). The I-ratio is defined by the relationship:

$$I\text{-ratio}=I(110)/[I(110)+I(002)] \qquad \text{EQ. 9}$$

where I(110) and I(002) are the peak heights of the XRD reflections from the (110) and (002) planes in the cordierite crystal lattice, based upon hexagonal indexing of the XRD peaks. The I-ratio is measured by x-ray diffractometry using copper K$\alpha$ radiation on either the axial cross section (orthogonal to the length of the channels) or the transverse surface (as-fired surface of the honeycomb walls). The I-ratios provide a quantitative measure of the degree to which the cordierite crystallites in the honeycomb article are oriented with their negative thermal expansion c-axes parallel to the plane of the honeycomb wall. A high degree of such orientation is desirable because it reduces the CTE of the honeycomb article in both the axial direction (within the plane of the wall, parallel to the lengths of the channels) and radial direction (within the plane of the wall, orthogonal to the lengths of the channels). For randomly oriented cordierite crystals, $I_A$ and $I_T$ are both equal to approximately 0.65. Values of $I_T$ greater than 0.65 and values of $I_A$ lower than 0.65 indicate that the cordierite crystals are preferentially oriented with their c-axes parallel to the plane of the wall. If all of the cordierite crystals were to lie with their c-axes in the plane of the wall, the value of $I_T$ would be 1.0 and the value of $I_A$ would be 0.0.

All modulus of rupture (MOR), or flexural strength, values were measured at room temperature by the four-point method on a cellular bar (1 inch×½ inch×5 inch long) parallel to the axial direction of the honeycomb. Elastic modulus values at room temperature were measured by a sonic resonance technique also on a cellular bar (1 inch×½ inch×5 inch long) parallel to the axial direction. Cell geometries are listed as "N/w" where "N" is the cell density as number of cells per square inch, and "w" is the channel wall thickness in units of $10^{-3}$ inches ("mils"). The ratio of MOR to elastic modulus, MOR/E, provided in the Tables is expressed as a percentage; thus, for example, a value of MOR/E=0.075% is equal to a value of MOR/E=$0.075 \times 10^{-2}$=$7.5 \times 10^{-4}$.

Some of the fired honeycomb bodies were plugged at the ends of alternate channels in a checkerboard pattern such that a channel that was plugged at one end was open at the other end, thereby forming a wall-flow filter. The pressure drop across the filter bodies was measured as follows. Each filter was wrapped in a ceramic fibrous mat and securely encased in a cylindrical metal holder. The holder and filter were attached at each end to metal pipes through which a stream of air was passed. The pressure drop across the filter, that is, the pressure difference between the inlet and outlet faces, was measured as a function of gas flow rate. Flow rates of 15 to 210 scfm (standard cubic feet per minute) were used for the 5.66" diameter filters. The pressure drops for these samples, prior to the introduction of carbon particles into the filters, are referred to as the "clean" pressure drops, and these clean pressure drops increase with increasing flow rate.

After the clean pressure drops were measured, the samples were transferred to a second facility where they were again attached to a metal pipe into which a stream of air was passed. A very fine carbon soot was then aspirated into this air stream for a period of time, thereby partially loading the filter with carbon by coating the walls of the inlet channels with a layer of carbon particles. The sample was then taken back to the first apparatus and its pressure drop re-measured as a function of flow rate. This process was repeated for various increasing levels of carbon soot loading. Thus, pressure drops were determined as a function of flow rate and mass of carbon soot contained within the filter. In most cases, levels of carbon soot loading ranged from approximately 0.5 to 5 grams per liter of filter volume.

Figure 8:
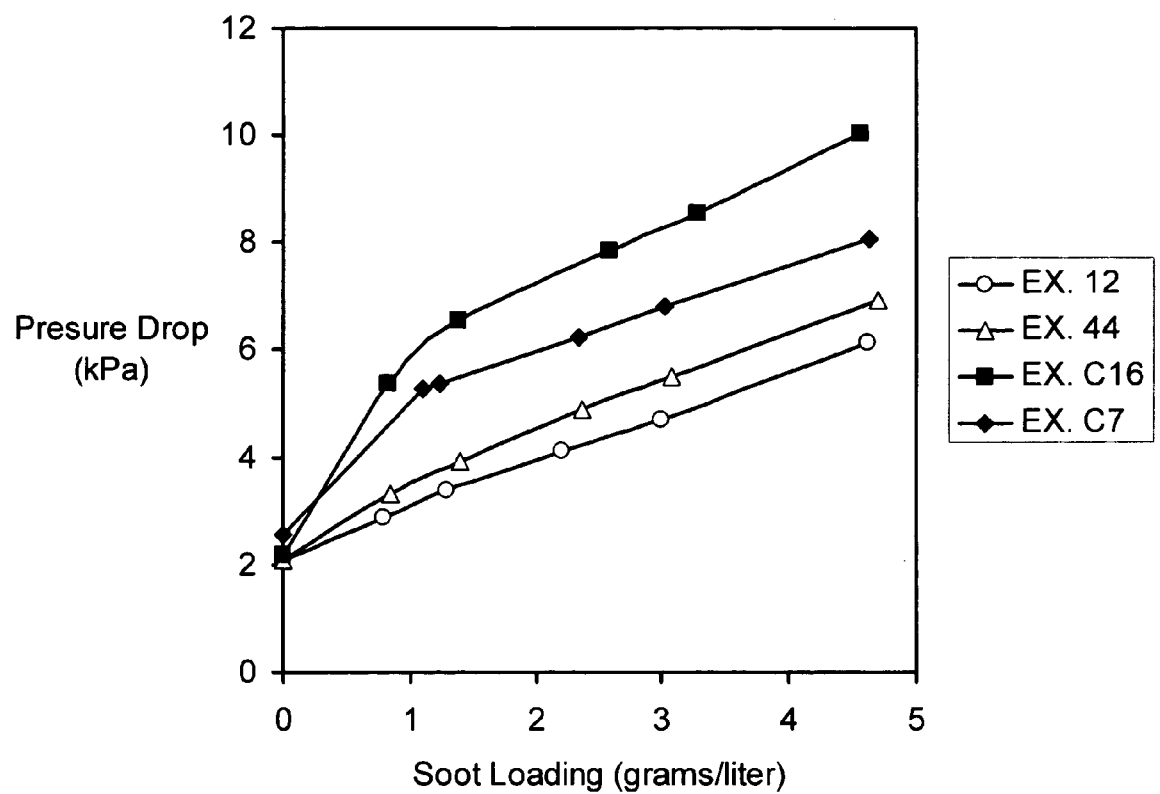
FIG. 8 is a plot of the pressure drop versus soot loading across 5.66-inch diameter, 6-inch long filters having a cell density of approximately 200 cells/inch$^2$ and a wall thickness of approximately 0.020 inches for Inventive Examples 12 and 44 and for Comparative Examples C7 and C16, measured at room temperature at a flow rate of 210 standard cubic feet per meter.

The conditions of the test method described above are meant to provide a relative comparison of the behaviors of the filters in environments of flowing gas and carbon soot build-up on the walls of the filter, analogous to the environment that a filter would experience if placed in the exhaust path of a diesel engine. To minimize reduction in engine performance, it is desired that the pressure drop of a filter that is loaded with a given mass per volume of carbon soot be as low as possible. Pressure drop versus soot loading data are shown for two inventive and two comparative examples in FIG. 8, demonstrating the benefit of the pore microstructures of the present invention in reducing soot-loaded pressure drop.

TABLE 1

Raw materials used in compositions 1-9

| Raw Material* | Composition Number | | | | | | | | |
|---|---|---|---|---|---|---|---|---|---|
| | 1 | 2 | 3 | 4 | 5 | 6 | 7 | 8 | 9 |
| Talc B (23) [0.95] | 40.70 | 40.70 | 0 | 40.70 | 40.70 | 40.70 | 40.70 | 40.70 | 40.70 |
| Calcined Talc C (23) [0.95] | 0 | 0 | 39.53 | 0 | 0 | 0 | 0 | 0 | 0 |
| Kaolin A (11) | 0 | 16.00 | 0 | 0 | 0 | 0 | 0 | 0 | 0 |
| Kaolin B (3.5) | 16.00 | 0 | 16.32 | 16.00 | 16.00 | 16.00 | 16.00 | 16.00 | 16.00 |
| Alumina C (6.5) | 0 | 0 | 15.09 | 14.80 | 14.80 | 14.80 | 14.80 | 14.80 | 14.80 |
| Alumina D (3.0) | 14.80 | 14.80 | 0 | 0 | 0 | 0 | 0 | 0 | 0 |
| Al(OH)$_3$ B (13) | 0 | 16.00 | 0 | 0 | 0 | 0 | 0 | 0 | 16.00 |
| Al(OH)$_3$ C (12) | 0 | 0 | 0 | 0 | 16.00 | 16.00 | 16.00 | 0 | 0 |
| Al(OH)$_3$ D (12) | 0 | 0 | 0 | 0 | 0 | 0 | 0 | 16.00 | 0 |
| Al(OH)$_3$ E (11.5) | 0 | 0 | 16.32 | 16.00 | 0 | 0 | 0 | 0 | 0 |
| Al(OH)$_3$ F (5.0) | 16.00 | 0 | 0 | 0 | 0 | 0 | 0 | 0 | 0 |
| Quartz C (23) | 12.50 | 12.50 | 12.75 | 12.50 | 12.50 | 12.50 | 12.50 | 12.50 | 12.50 |
| Graphite B (124) | 20.00 | 0 | 0 | 0 | 0 | 0 | 0 | 0 | 0 |
| Graphite D (35) | 0 | 0 | 0 | 0 | 10.00 | 20.00 | 0 | 10.00 | 0 |
| Polyethylene Beads (14) | 0 | 0 | 0 | 0 | 5.00 | 0 | 5.00 | 0 | 0 |

*( ) = median particle diameter by laser diffraction, [ ] = talc XRD Morphology Index

TABLE 2

Raw materials used in compositions 10-18

| Raw Material* | Composition Number | | | | | | | | |
|---|---|---|---|---|---|---|---|---|---|
| | 10 | 11 | 12 | 13 | 14 | 15 | 16 | 17 | 18 |
| Talc A (28) [0.94] | 0 | 0 | 0 | 0 | 0 | 0 | 40.38 | 0 | 40.38 |
| Talc B (23) [0.95] | 41.31 | 40.70 | 41.60 | 40.70 | 40.70 | 40.70 | 0 | 39.96 | 0 |
| Kaolin B (3.5) | 6.00 | 16.00 | 0 | 16.00 | 16.00 | 16.00 | 0 | 0 | 0 |
| Calcined Kaolin C (3.0) | 0 | 0 | 14.10 | 0 | 0 | 0 | 0 | 0 | 0 |
| Alumina C (6.5) | 19.23 | 14.80 | 15.10 | 14.80 | 14.80 | 14.80 | 21.77 | 21.54 | 21.77 |
| Al(OH)$_3$ B (13) | 16.00 | 16.00 | 16.40 | 16.00 | 16.00 | 16.00 | 0 | 0 | 0 |
| Al(OH)$_3$ F (5.0) | 0 | 0 | 0 | 0 | 0 | 0 | 10.31 | 16.35 | 10.31 |
| Boehmite (0.2) | 0 | 0 | 0 | 0 | 0 | 0 | 5.05 | 0 | 5.05 |
| Quartz B (25) | 17.46 | 0 | 0 | 0 | 0 | 0 | 22.39 | 0 | 22.39 |
| Quartz C (23) | 0 | 12.50 | 12.80 | 12.50 | 12.50 | 12.50 | 0 | 22.15 | 0 |
| Graphite A (126) | 0 | 5.00 | 0 | 0 | 0 | 0 | 0 | 0 | 0 |
| Graphite C (49) | 0 | 0 | 0 | 0 | 18.00 | 0 | 0 | 0 | 0 |
| Graphite D (35) | 5.00 | 0 | 0 | 0 | 0 | 20.00 | 0 | 0 | 0 |
| Polyethylene Beads (14) | 0 | 0 | 0 | 10.00 | 0 | 0 | 0 | 0 | 5.00 |

*( ) = median particle diameter by laser diffraction, [ ] = talc XRD Morphology Index

TABLE 3

Raw materials used in compositions 19-27

| Raw Material* | Composition Number | | | | | | | | |
|---|---|---|---|---|---|---|---|---|---|
| | 19 | 20 | 21 | 22 | 23 | 24 | 25 | 26 | 27 |
| Talc A (28) [0.94] | 0 | 0 | 0 | 0 | 0 | 0 | 0 | 0 | 41.60 |
| Talc B (23) [0.95] | 39.96 | 39.96 | 40.38 | 40.61 | 0 | 41.69 | 0 | 39.96 | 0 |
| Talc D (8.5) [0.94] | 0 | 0 | 0 | 0 | 41.69 | 0 | 39.96 | 0 | 0 |
| Alumina B (6.5) | 21.54 | 21.54 | 21.77 | 11.99 | 21.88 | 21.88 | 21.54 | 21.54 | 21.60 |
| Al(OH)$_3$ B (13) | 0 | 0 | 0 | 0 | 16.00 | 16.00 | 16.35 | 16.35 | 16.40 |
| Al(OH)$_3$ C (12) | 0 | 0 | 0 | 12.95 | 0 | 0 | 0 | 0 | 0 |
| Al(OH)$_3$ F (5.0) | 16.35 | 16.35 | 10.31 | 0 | 0 | 0 | 0 | 0 | 0 |
| Boehmite (0.2) | 0 | 0 | 5.05 | 6.00 | 0 | 0 | 0 | 0 | 0 |
| Quartz A (35) | 0 | 0 | 0 | 0 | 0 | 0 | 0 | 0 | 20.40 |
| Quartz B (25) | 0 | 22.15 | 22.39 | 12.45 | 20.43 | 0 | 0 | 0 | 0 |
| Quartz C (23) | 22.15 | 0 | 0 | 0 | 0 | 0 | 0 | 22.15 | 0 |
| Quartz D (3.5) | 0 | 0 | 0 | 0 | 0 | 20.43 | 22.15 | 0 | 0 |
| Graphite D (35) | 10.00 | 10.00 | 15.00 | 0 | 0 | 0 | 5.00 | 0 | 20.00 |

*( ) = median particle diameter by laser diffraction, [ ] = talc XRD Morphology Index

TABLE 4

Raw materials used in compositions C1-C8

| Raw Material* | Composition Number | | | | | | | |
|---|---|---|---|---|---|---|---|---|
| | C1 | C2 | C3 | C4 | C5 | C6 | C7 | C8 |
| Talc B (23) [0.95] | 40.70 | 0 | 0 | 0 | 40.70 | 40.70 | 0 | 0 |
| Talc I (22) [0.95] | 0 | 0 | 40.70 | 40.70 | 0 | 0 | 0 | 40.70 |
| Talc K (15) [approx. 0.70] | 0 | 40.70 | 0 | 0 | 0 | 0 | 40.70 | 0 |
| Alumina D (3.0) | 14.80 | 14.80 | 14.80 | 14.80 | 14.80 | 14.80 | 14.80 | 14.80 |
| Al(OH)$_3$ F (5.0) | 16.00 | 16.00 | 16.00 | 16.00 | 16.00 | 16.00 | 16.00 | 16.00 |
| Kaolin B (3.5) | 16.00 | 16.00 | 16.00 | 16.00 | 16.00 | 16.00 | 16.00 | 16.00 |
| Quartz C (23) | 12.50 | 12.50 | 12.50 | 12.50 | 12.50 | 12.50 | 12.50 | 12.50 |
| Graphite B (124) | 0 | 0 | 0 | 0 | 20.00 | 0 | 0 | 0 |
| Graphite D (35) | 0 | 20.00 | 20.00 | 0 | 0 | 0 | 40.00 | 0 |
| Graphite F (29) | 0 | 0 | 0 | 0 | 0 | 20.00 | 0 | 0 |
| Graphite G (9.5) | 0 | 0 | 0 | 20.00 | 0 | 0 | 0 | 40.00 |

*( ) = median particle diameter by laser diffraction, [ ] = talc XRD Morphology Index

TABLE 5

Raw materials used in compositions C9-C16

| Raw Material* | Composition Number | | | | | | | |
|---|---|---|---|---|---|---|---|---|
| | C9 | C10 | C11 | C12 | C13 | C14 | C15 | C16 |
| Talc H (27) [0.95] | 0 | 39.90 | 40.70 | 0 | 0 | 0 | 0 | 0 |
| Talc B (23) [0.95] | 39.90 | 0 | 0 | 39.90 | 0 | 0 | 40.70 | 40.70 |
| Talc J (19) [0.65] | 0 | 0 | 0 | 0 | 39.90 | 39.90 | 0 | 0 |
| Alumina C (6.5) | 15.00 | 15.00 | 14.80 | 15.00 | 15.00 | 15.00 | 14.80 | 0 |
| Alumina F (0.6) | 0 | 0 | 0 | 0 | 0 | 0 | 0 | 14.80 |
| Al(OH)$_3$ B (13) | 0 | 0 | 0 | 0 | 0 | 0 | 16.00 | 0 |
| Al(OH)$_3$ F (5.0) | 15.80 | 15.80 | 16.00 | 15.80 | 15.80 | 15.80 | 0 | 16.00 |
| Kaolin B (3.5) | 16.60 | 16.60 | 16.00 | 16.60 | 16.60 | 16.60 | 16.00 | 16.00 |
| Quartz E (100) | 0 | 0 | 0 | 0 | 0 | 0 | 0 | 6.30 |
| Quartz C (23) | 0 | 0 | 0 | 0 | 0 | 0 | 12.50 | 0 |
| Quartz G (20) | 12.70 | 12.70 | 12.50 | 12.70 | 0 | 12.70 | 0 | 6.30 |
| Quartz D (3.5) | 0 | 0 | 0 | 0 | 12.70 | 0 | 0 | 0 |
| Graphite A (126) | 0 | 0 | 0 | 0 | 15.00 | 15.00 | 0 | 0 |
| Graphite E (39) | 0 | 0 | 0 | 10.00 | 0 | 0 | 0 | 0 |

*( ) = median particle diameter by laser diffraction, [ ] = talc XRD Morphology Index

TABLE 6

Raw materials used in compositions C17-C23

| Raw Material* | Composition Number | | | | | | |
|---|---|---|---|---|---|---|---|
| | C17 | C18 | C19 | C20 | C21 | C22 | C23 |
| Talc E (69) | 40.70 | 0 | 0 | 0 | 41.36 | 39.71 | 39.71 |
| Talc G (38) [0.95] | 0 | 39.90 | 0 | 0 | 0 | 0 | 0 |
| Talc J (19) [0.65] | 0 | 0 | 39.90 | 0 | 0 | 0 | 0 |
| Talc L (5) [0.88] | 0 | 0 | 0 | 39.96 | 0 | 0 | 0 |
| Alumina C (6.5) | 0 | 15.00 | 15.00 | 21.54 | 29.18 | 20.48 | 20.48 |
| Alumina D (3.0) | 14.80 | 0 | 0 | 0 | 0 | 0 | 0 |
| Al(OH)$_3$ F (5.0) | 16.00 | 15.80 | 15.80 | 16.35 | 0 | 11.52 | 11.52 |
| Boehmite (0.2) | 0 | 0 | 0 | 0 | 5.72 | 5.49 | 5.49 |
| Kaolin B (3.5) | 16.00 | 16.60 | 16.60 | 0 | 0 | 0 | 0 |
| Quartz C (23) | 12.50 | 0 | 0 | 22.15 | 0 | 0 | 0 |
| Quartz F (21) | 0 | 0 | 0 | 0 | 0 | 0 | 22.79 |
| Quartz G (20) | 0 | 12.70 | 0 | 0 | 0 | 0 | 0 |
| Quartz D (3.5) | 0 | 0 | 0 | 0 | 23.74 | 22.79 | 0 |
| Fused Silica (46) | 0 | 0 | 12.70 | 0 | 0 | 0 | 0 |
| Graphite A (126) | 0 | 0 | 15.00 | 0 | 0 | 0 | 0 |
| Graphite B (124) | 20.00 | 0 | 0 | 0 | 0 | 0 | 0 |

*( ) = median particle diameter by laser diffraction, [ ] = talc XRD Morphology Index

TABLE 7

Properties of Inventive Examples 1-8

| | Example Number | | | | | | | |
|---|---|---|---|---|---|---|---|---|
| | 1 | 2 | 3 | 4 | 5 | 6 | 7 | 8 |
| | Composition Number | | | | | | | |
| | 1 | 1 | 2 | 3 | 3 | 3 | 3 | 4 |
| Firing Temperature (° C.) | 1400 | 1420 | 1418 | 1405 | 1407 | 1415 | 1415 | 1415 |
| Hold Time (hours) | 15 | 15 | 15 | 15 | 15 | 15 | 15 | 15 |
| 1150-1200 Heating Rate (° C./hr) | 150 | 150 | 21 | 150 | 150 | 90 | 150 | 150 |
| 1200-1300 Heating Rate (° C./hr) | 150 | 150 | 100 | 150 | 150 | 90 | 150 | 150 |
| 1300-1360 Heating Rate (° C./hr) | 150 | 150 | 100 | 150 | 150 | 90 | 150 | 150 |
| 1360-Tmax Heating Rate (° C./hr) | 150 | 150 | 100 | 150 | 150 | 90 | 150 | 150 |
| CTE, 25-800 ($10^{-7}$/° C.) | 4.5 | 0.9 | 6.1 | 11.4 | 10.4 | 8.9 | 8.0 | 5.4 |

TABLE 7-continued

Properties of Inventive Examples 1-8

| | Example Number | | | | | | | |
|---|---|---|---|---|---|---|---|---|
| | 1 | 2 | 3 | 4 | 5 | 6 | 7 | 8 |
| | Composition Number | | | | | | | |
| | 1 | 1 | 2 | 3 | 3 | 3 | 3 | 4 |
| Axial I-Ratio | 0.44 | 0.49 | 0.49 | 0.49 | 0.47 | 0.45 | 0.5 | 0.53 |
| Transverse I-Ratio | 0.87 | 0.85 | 0.8 | 0.82 | 0.82 | 0.84 | 0.79 | 0.77 |
| $P_c$ Parameter | 8.9 | 5.1 | 7.8 | 10.7 | 9.2 | 7.6 | 8.8 | 8.8 |
| $d_{50}$ of $Al_2O_3$-Forming Sources (μm) | 4.0 | 4.0 | 8.2 | 9.1 | 9.1 | 9.1 | 9.1 | 9.1 |
| $d_{50}$ of Talc Sources (μm) | 23.0 | 23.0 | 23.0 | 23.0 | 23.0 | 23.0 | 23.0 | 23.0 |
| $d_{50}$ of Silica-Forming Sources (μm) | 23.0 | 23.0 | 23.0 | 23.0 | 23.0 | 23.0 | 23.0 | 23.0 |
| $d_{50}$ of Talc + Silica-Forming Sources (μm) | 23.0 | 23.0 | 23.0 | 23.0 | 23.0 | 23.0 | 23.0 | 23.0 |
| Weight % Pore Formers | 20.0 | 20.0 | 0 | 0 | 0 | 0 | 0 | 0 |
| Weight % Kaolin Sources | 16.0 | 16.0 | 16.0 | 16.3 | 16.3 | 16.3 | 16.3 | 16.0 |
| % Porosity | 51 | 50 | 42 | 41 | 40 | 42 | 43 | 46 |
| $d_1$ (μm) | 3.2 | 2.1 | 0.4 | 6.5 | 9.1 | 6.1 | 6.9 | 3.1 |
| $d_5$ (μm) | 6.9 | 6.8 | 6.8 | 9.2 | 11.8 | 8.3 | 9.0 | 7.1 |
| $d_{10}$ (μm) | 8.7 | 8.6 | 8.2 | 10.4 | 13.1 | 9.4 | 10.4 | 9.2 |
| $d_{50}$ (μm) | 15.7 | 15.9 | 13.3 | 14.6 | 17.5 | 13.7 | 15.5 | 16.4 |
| $d_{90}$ (μm) | 33.6 | 29.3 | 34.3 | 32.1 | 29.4 | 24.0 | 27.7 | 31.9 |
| $d_{95}$ (μm) | 56.9 | 46.4 | 54.7 | 48.5 | 48.9 | 42.6 | 49.8 | 52.8 |
| $d_{99}$ (μm) | 175 | 155 | 155 | 165 | 154 | 155 | 157 | 163 |
| $d_f = (d_{50} - d_{10})/d_{50}$ | 0.45 | 0.43 | 0.38 | 0.29 | 0.25 | 0.31 | 0.33 | 0.44 |
| $d_b = (d_{90} - d_{10})/d_{50}$ | 1.59 | 1.33 | 1.95 | 1.49 | 0.93 | 1.07 | 1.13 | 1.39 |
| % Total Pore Volume <10 μm | 15.0 | 14.9 | 18.5 | 8.0 | 1.7 | 13.3 | 8.4 | 12.5 |
| % Total Pore Volume >30 μm | 12.0 | 9.6 | 12.6 | 11.1 | 9.6 | 7.4 | 9.0 | 11.1 |
| $P_{10}$ Parameter | 20.6 | 20.6 | 20.0 | 21.3 | 21.3 | 19.9 | 21.3 | 21.4 |

TABLE 8

Properties of Inventive Examples 9-16

| | Example Number | | | | | | | |
|---|---|---|---|---|---|---|---|---|
| | 9 | 10 | 11 | 12 | 13 | 14 | 15 | 16 |
| | Composition Number | | | | | | | |
| | 5 | 5 | 6 | 6 | 7 | 8 | 9 | 9 |
| Firing Temperature (° C.) | 1420 | 1430 | 1420 | 1430 | 1430 | 1430 | 1425 | 1415 |
| Hold Time (hours) | 15 | 30 | 15 | 30 | 30 | 30 | 15 | 15 |
| 1150-1200 Heating Rate (° C./hr) | 20 | 20 | 20 | 20 | 20 | 20 | 83 | 150 |
| 1200-1300 Heating Rate (° C./hr) | 50 | 50 | 50 | 50 | 50 | 50 | 83 | 150 |
| 1300-1360 Heating Rate (° C./hr) | 50 | 50 | 50 | 50 | 50 | 50 | 83 | 150 |
| 1360-Tmax Heating Rate (° C./hr) | 50 | 50 | 50 | 50 | 50 | 50 | 83 | 150 |
| CTE, 25-800 ($10^{-7}$/° C.) | 8.1 | 5.5 | 7.2 | 5.8 | 5.8 | 4.8 | 4.5 | 7.3 |
| Axial I-Ratio | — | 0.42 | — | 0.41 | 0.44 | 0.43 | 0.4 | 0.54 |
| Transverse I-Ratio | — | 0.85 | — | 0.86 | 0.85 | 0.87 | 0.8 | 0.77 |
| $P_c$ Parameter | 8.9 | 6.9 | 9.6 | 7.5 | 5.3 | 6.0 | 6.6 | 9.0 |
| $d_{50}$ of $Al_2O_3$-Forming Sources (μm) | 9.4 | 9.4 | 9.4 | 9.4 | 9.4 | 9.4 | 9.9 | 9.9 |
| $d_{50}$ of Talc Sources (μm) | 23.0 | 23.0 | 23.0 | 23.0 | 23.0 | 23.0 | 23.0 | 23.0 |
| $d_{50}$ of Silica-Forming Sources (μm) | 23.0 | 23.0 | 23.0 | 23.0 | 23.0 | 23.0 | 23.0 | 23.0 |
| $d_{50}$ of Talc + Silica-Forming Sources (μm) | 23.0 | 23.0 | 23.0 | 23.0 | 23.0 | 23.0 | 23.0 | 23.0 |
| Weight % Pore Formers | 15.0 | 15.0 | 20.0 | 20.0 | 5.0 | 10.0 | 0 | 0 |
| Weight % Kaolin Sources | 16.0 | 16.0 | 16.0 | 16.0 | 16.0 | 16.0 | 16.0 | 16.0 |
| % Porosity | 53 | 51 | 53 | 53 | 48 | 45 | 42 | 44 |
| $d_1$ (μm) | 3.8 | 3.5 | 2.9 | 3.9 | 2.7 | 2.4 | 2.4 | 4.3 |
| $d_5$ (μm) | 6.7 | 7.5 | 6.9 | 8.1 | 6.6 | 6.9 | 7.1 | 7.3 |
| $d_{10}$ (μm) | 8.4 | 9.1 | 8.8 | 9.7 | 8.4 | 8.4 | 8.9 | 9.0 |
| $d_{50}$ (μm) | 15.5 | 15.6 | 16.5 | 16.4 | 15.3 | 14.7 | 15.3 | 15.6 |
| $d_{90}$ (μm) | 26.7 | 28.2 | 29.8 | 27.3 | 27.9 | 25.8 | 27.5 | 30.9 |
| $d_{95}$ (μm) | 39.2 | 43.8 | 46.7 | 38.5 | 40.1 | 40.0 | 47.3 | 51.7 |
| $d_{99}$ (μm) | 114 | 138 | 152 | 95 | 97 | 134 | 185 | 156 |
| $d_f = (d_{50} - d_{10})/d_{50}$ | 0.46 | 0.42 | 0.47 | 0.41 | 0.45 | 0.43 | 0.42 | 0.42 |
| $d_b = (d_{90} - d_{10})/d_{50}$ | 1.18 | 1.22 | 1.27 | 1.07 | 1.28 | 1.18 | 1.22 | 1.41 |
| % Total Pore Volume <10 μm | 16.2 | 14.1 | 14.4 | 11.1 | 16.8 | 17.1 | 14.2 | 13.6 |
| % Total Pore Volume >30 μm | 7.8 | 8.9 | 9.9 | 8.1 | 9.1 | 7.7 | 8.8 | 10.5 |
| $P_{10}$ Parameter | 18.7 | 18.7 | 18.9 | 18.9 | 18.5 | 18.6 | 19.9 | 21.6 |
| Cell Geometry (cpsi/mils) | 200/18 | 200/18 | 200/18 | 200/18 | 200/18 | 200/18 | 200/19 | — |
| MOR at 25° C. (psi) | 620 | 728 | 628 | 754 | 671 | 916 | 783 | — |

TABLE 8-continued

Properties of Inventive Examples 9-16

| | Example Number | | | | | | | |
|---|---|---|---|---|---|---|---|---|
| | 9 | 10 | 11 | 12 | 13 | 14 | 15 | 16 |
| | | | | Composition Number | | | | |
| | 5 | 5 | 6 | 6 | 7 | 8 | 9 | 9 |
| Elastic Modulus at 25° C. ($10^6$ psi) | 0.92 | 0.86 | 0.91 | 0.89 | 1.04 | 1.21 | 1.30 | — |
| MOR/E (%) | 0.067 | 0.085 | 0.069 | 0.085 | 0.065 | 0.076 | 0.060 | — |

*100° C./h 1360-1400° C., 26° C./h 1400-1418° C.
**28° C./hr 1360-1400° C., 5° C./h 1400-1415° C.

TABLE 9

Properties of Inventive Examples 17-24

| | Example Number | | | | | | | |
|---|---|---|---|---|---|---|---|---|
| | 17 | 18 | 19 | 20 | 21 | 22 | 23 | 24 |
| | | | | Composition Number | | | | |
| | 9 | 9 | 10 | 11 | 11 | 11 | 12 | 13 |
| Firing Temperature (° C.) | 1425 | 1425 | 1425 | 1415 | 1415 | 1400 | 1418 | 1425 |
| Hold Time (hours) | 15 | 30 | 30 | 15 | 15 | 15 | 15 | 15 |
| 1150-1200 Heating Rate (° C./hr) | 100 | 100 | 100 | 90 | 150 | 150 | 21 | 50 |
| 1200-1300 Heating Rate (° C./hr) | 100 | 100 | 100 | 90 | 150 | 150 | 100 | 80 |
| 1300-1360 Heating Rate (° C./hr) | 100 | 100 | 100 | 90 | 150 | 150 | 100 | 80 |
| 1360-Tmax Heating Rate (° C./hr) | 100 | 100 | 100 | 90 | 150 | 150 | 100 | 80 |
| CTE, 25-800 ($10^{-7}$/° C.) | 4.7 | 2.5 | 7.9 | 6.9 | 9.4 | 11.5 | — | 6.2 |
| Axial I-Ratio | 0.40 | 0.39 | 0.37 | 0.44 | 0.5 | 0.43 | 0.45 | — |
| Transverse I-Ratio | 0.85 | 0.84 | 0.84 | 0.86 | 0.79 | 0.82 | 0.84 | — |
| $P_c$ Parameter | 6.7 | 5.3 | 8.9 | 7.9 | 9.1 | 12.0 | 7.9 | 8.4 |
| $d_{50}$ of $Al_2O_3$-Forming Sources (μm) | 9.9 | 9.9 | 9.5 | 9.9 | 9.9 | 9.9 | 9.9 | 9.9 |
| $d_{50}$ of Talc Sources (μm) | 23.0 | 23.0 | 23.0 | 23.0 | 23.0 | 23.0 | 23.0 | 23.0 |
| $d_{50}$ of Silica-Forming Sources (μm) | 23.0 | 23.0 | 25.0 | 23.0 | 23.0 | 23.0 | 23.0 | 23.0 |
| $d_{50}$ of Talc + Silica-Forming Sources (μm) | 23.0 | 23.0 | 23.6 | 23.0 | 23.0 | 23.0 | 23.0 | 23.0 |
| Weight % Pore Formers | 0 | 0 | 5.0 | 5.0 | 5.0 | 5.0 | 0 | 10.0 |
| Weight % Kaolin Sources | 16.0 | 16.0 | 6.0 | 16.0 | 16.0 | 16.0 | 14.1 | 16.0 |
| % Porosity | 41 | 43 | 49 | 44 | 45 | 42 | 48 | 50 |
| $d_1$ (μm) | 6.2 | 6.2 | — | 5.1 | 7.1 | 8.7 | 1.7 | 4.0 |
| $d_5$ (μm) | 8.6 | 8.3 | — | 7.4 | 9.4 | 11.6 | 7.6 | 7.3 |
| $d_{10}$ (μm) | 10.3 | 10.1 | 9.4 | 9.3 | 11.0 | 13.0 | 9.7 | 8.8 |
| $d_{50}$ (μm) | 16.6 | 16.4 | 16.8 | 16.1 | 16.9 | 17.9 | 16.7 | 14.6 |
| $d_{90}$ (μm) | 29.8 | 32.0 | 31.2 | 31.2 | 30.9 | 33.6 | 27.3 | 29.1 |
| $d_{95}$ (μm) | 54.7 | 57.6 | — | 52.2 | 50.3 | 56.9 | 45.8 | 57.9 |
| $d_{99}$ (μm) | 220 | 201 | — | 159 | 146 | 176 | 145 | 241 |
| $d_f = (d_{50} - d_{10})/d_{50}$ | 0.38 | 0.39 | 0.44 | 0.42 | 0.35 | 0.27 | 0.42 | 0.40 |
| $d_b = (d_{90} - d_{10})/d_{50}$ | 1.17 | 1.33 | 1.30 | 1.35 | 1.17 | 1.15 | 1.06 | 1.39 |
| % Total Pore Volume <10 μm | 8.9 | 9.9 | 11.8 | 12.5 | 6.8 | 2.0 | 11.1 | 15.7 |
| % Total Pore Volume >30 μm | 9.9 | 11.0 | 10.5 | 10.5 | 10.5 | 12.0 | 8.7 | 9.6 |
| $P_{10}$ Parameter | 20.4 | 20.4 | 23.0 | 20.3 | 21.7 | 21.7 | 20.6 | 20.1 |

*100° C./h 1360-1400° C., 26° C./h 1400-1418° C.
**28° C./hr 1360-1400° C., 5° C./h 1400-1415° C.

TABLE 10

Properties of Inventive Examples 25-32

| | Example Number | | | | | | | |
|---|---|---|---|---|---|---|---|---|
| | 25 | 26 | 27 | 28 | 29 | 30 | 31 | 32 |
| | | | | Composition Number | | | | |
| | 14 | 14 | 15 | 16 | 16 | 16 | 16 | 17 |
| Firing Temperature (° C.) | 1425 | 1425 | 1425 | 1425 | 1430 | 1430 | 1430 | 1425 |
| Hold Time (hours) | 30 | 15 | 15 | 15 | 15 | 30 | 30 | 22.5 |
| 1150-1200 Heating Rate (° C./hr) | 100 | 100 | 50 | 25 | 75 | 75 | 100 | 47 |
| 1200-1300 Heating Rate (° C./hr) | 100 | 100 | 80 | 25 | 75 | 75 | 100 | 47 |
| 1300-1360 Heating Rate (° C./hr) | 100 | 100 | 80 | 25 | 6 | 6 | 6 | 47 |
| 1360-Tmax Heating Rate (° C./hr) | 100 | 100 | 80 | 5 | 6 | 6 | 6 | 47 |

TABLE 10-continued

Properties of Inventive Examples 25-32

| | Example Number | | | | | | | |
|---|---|---|---|---|---|---|---|---|
| | 25 | 26 | 27 | 28 | 29 | 30 | 31 | 32 |
| | Composition Number | | | | | | | |
| | 14 | 14 | 15 | 16 | 16 | 16 | 16 | 17 |
| CTE, 25-800 ($10^{-7}$/° C.) | 7.6 | 7.1 | 7.1 | 7.9 | 4.5 | 2.5 | 2.0 | 7.4 |
| Axial I-Ratio | 0.44 | 0.44 | 0.46 | — | — | — | — | 0.31 |
| Transverse I-Ratio | 0.81 | 0.81 | 0.8 | — | — | — | — | 0.92 |
| $P_c$ Parameter | 7.7 | 9.1 | 9.7 | 6.2 | 5.3 | 3.9 | 3.9 | 6.7 |
| $d_{50}$ of $Al_2O_3$-Forming Sources (μm) | 9.9 | 9.9 | 9.9 | 5.2 | 5.2 | 5.2 | 5.2 | 5.9 |
| $d_{50}$ of Talc Sources (μm) | 23.0 | 23.0 | 23.0 | 28.0 | 28.0 | 28.0 | 28.0 | 23.0 |
| $d_{50}$ of Silica-Forming Sources (μm) | 23.0 | 23.0 | 23.0 | 25.0 | 25.0 | 25.0 | 25.0 | 23.0 |
| $d_{50}$ of Talc + Silica-Forming Sources (μm) | 23.0 | 23.0 | 23.0 | 26.9 | 26.9 | 26.9 | 26.9 | 23.0 |
| Weight % Pore Formers | 18.0 | 18.0 | 20.0 | 0 | 0 | 0 | 0 | 0 |
| Weight % Kaolin Sources | 16.0 | 16.0 | 16.0 | 0 | 0 | 0 | 0 | 0 |
| % Porosity | 53 | 52 | 52 | 45 | 41 | 43 | 41 | 43 |
| $d_1$ (μm) | 4.6 | 3.7 | 3.2 | 5.7 | 6.1 | 4.6 | 7.4 | — |
| $d_5$ (μm) | 7.6 | 9.5 | 6.6 | 7.4 | 7.9 | 7.5 | 9.1 | — |
| $d_{10}$ (μm) | 9.9 | 12.0 | 8.4 | 8.7 | 9.1 | 8.7 | 10.4 | 8.6 |
| $d_{50}$ (μm) | 17.3 | 19.3 | 14.9 | 15.8 | 15.1 | 14.6 | 16.3 | 14.8 |
| $d_{90}$ (μm) | 29.9 | 34.1 | 25.5 | 34.4 | 27.1 | 24.9 | 29.8 | 28.3 |
| $d_{95}$ (μm) | 48.1 | 56.3 | 40.0 | 54.9 | 40.4 | 35.1 | 49.3 | — |
| $d_{99}$ (μm) | 166 | 184 | 139 | 159 | 109 | 73 | 152 | — |
| $d_f = (d_{50} - d_{10})/d_{50}$ | 0.43 | 0.38 | 0.44 | 0.45 | 0.39 | 0.41 | 0.36 | 0.42 |
| $d_b = (d_{90} - d_{10})/d_{50}$ | 1.15 | 1.15 | 1.15 | 1.63 | 1.20 | 1.11 | 1.20 | 1.33 |
| % Total Pore Volume <10 μm | 10.3 | 5.8 | 17.6 | 16.1 | 14.5 | 17.0 | 8.4 | 16.5 |
| % Total Pore Volume >30 μm | 9.9 | 12.7 | 7.5 | 12.6 | 8.3 | 6.5 | 9.9 | 9.2 |
| $P_{10}$ Parameter | 21.0 | 21.0 | 20.4 | 18.7 | 18.5 | 18.5 | 18.9 | 19.6 |
| Cell Geometry (cpsi/mils) | 200/20 | 200/20 | 200/19 | 200/18 | — | — | — | — |
| MOR at 25° C. (psi) | — | — | 597 | 1111 | — | — | — | — |
| Elastic Modulus at 25° C. ($10^6$ psi) | — | — | 0.96 | — | — | — | — | — |
| MOR/E (%) | — | — | 0.062 | — | — | — | — | — |

*100° C./h 1360-1400° C., 26° C./h 1400-1418° C.

TABLE 11

Properties of Inventive Examples 33-40

| | Example Number | | | | | | | |
|---|---|---|---|---|---|---|---|---|
| | 33 | 34 | 35 | 36 | 37 | 38 | 39 | 40 |
| | Composition Number | | | | | | | |
| | 17 | 18 | 18 | 18 | 19 | 19 | 19 | 19 |
| Firing Temperature (° C.) | 1425 | 1425 | 1430 | 1430 | 1425 | 1425 | 1400 | 1425 |
| Hold Time (hours) | 30 | 15 | 15 | 30 | 15 | 15 | 8 | 15 |
| 1150-1200 Heating Rate (° C./hr) | 100 | 25 | 75 | 100 | 6 | 25 | 42 | 100 |
| 1200-1300 Heating Rate (° C./hr) | 100 | 25 | 75 | 100 | 6 | 25 | 33 | 100 |
| 1300-1360 Heating Rate (° C./hr) | 100 | 25 | 6 | 6 | 100 | 25 | 14 | 6 |
| 1360-Tmax Heating Rate (° C./hr) | 100 | 6 | 6 | 6 | 100 | 6 | 14 | 6 |
| CTE, 25-800 ($10^{-7}$/° C.) | 7.7 | 6.8 | 4.0 | 2.3 | 8.2 | 7.0 | — | 5.7 |
| Axial I-Ratio | 0.36 | 0.39 | — | — | 0.27 | — | — | 0.35 |
| Transverse I-Ratio | 0.90 | 0.9 | — | — | 0.91 | — | — | 0.88 |
| $P_c$ Parameter | 8.4 | 7.1 | 6.2 | 4.8 | 11.4 | 8.0 | 8.6 | 7.2 |
| $d_{50}$ of $Al_2O_3$-Forming Sources (μm) | 5.9 | 5.2 | 5.2 | 5.2 | 5.9 | 5.9 | 5.9 | 5.9 |
| $d_{50}$ of Talc Sources (μm) | 23.0 | 28.0 | 28.0 | 28.0 | 23.0 | 23.0 | 23.0 | 23.0 |
| $d_{50}$ of Silica-Forming Sources (μm) | 23.0 | 25.0 | 25.0 | 25.0 | 23.0 | 23.0 | 23.0 | 23.0 |
| $d_{50}$ of Talc + Silica-Forming Sources (μm) | 23.0 | 26.9 | 26.9 | 26.9 | 23.0 | 23.0 | 23.0 | 23.0 |
| Weight % Pore Formers | 0 | 5.0 | 5.0 | 5.0 | 10.0 | 10.0 | 10.0 | 10.0 |
| Weight % Kaolin Sources | 0 | 0 | 0 | 0 | 0 | 0 | 0 | 0 |
| % Porosity | 40 | 47 | 44 | 45 | 49 | 51 | 52 | 46 |
| $d_1$ (μm) | 6.8 | 7.2 | 5.0 | 6.9 | — | 8.0 | 6.2 | — |
| $d_5$ (μm) | 9.1 | 9.0 | 7.4 | 8.4 | — | 10.0 | 8.2 | — |
| $d_{10}$ (μm) | 10.2 | 10.4 | 8.5 | 9.5 | 8.2 | 11.4 | 9.5 | 9.6 |
| $d_{50}$ (μm) | 15.2 | 17.2 | 14.2 | 15.0 | 15.6 | 17.8 | 16.3 | 14.9 |
| $d_{90}$ (μm) | 26.0 | 32.8 | 25.9 | 25.9 | 29.2 | 29.7 | 30.1 | 27.7 |
| $d_{95}$ (μm) | 40.0 | 48.7 | 43.1 | 39.5 | — | 48.0 | 45.7 | — |
| $d_{99}$ (μm) | 138 | 116 | 157 | 123 | — | 170 | 127 | — |
| $d_f = (d_{50} - d_{10})/d_{50}$ | 0.32 | 0.39 | 0.40 | 0.37 | 0.47 | 0.36 | 0.42 | 0.36 |
| $d_b = (d_{90} - d_{10})/d_{50}$ | 1.04 | 1.30 | 1.22 | 1.09 | 1.35 | 1.03 | 1.26 | 1.21 |
| % Total Pore Volume <10 μm | 8.9 | 8.3 | 18.9 | 12.4 | 17.8 | 4.9 | 12.0 | 12.1 |

TABLE 11-continued

Properties of Inventive Examples 33-40

| | Example Number | | | | | | | |
|---|---|---|---|---|---|---|---|---|
| | 33 | 34 | 35 | 36 | 37 | 38 | 39 | 40 |
| | | | | Composition Number | | | | |
| | 17 | 18 | 18 | 18 | 19 | 19 | 19 | 19 |
| % Total Pore Volume >30 μm | 7.8 | 11.4 | 8.0 | 7.7 | 9.5 | 9.8 | 10.1 | 9.0 |
| $P_{10}$ Parameter | 21.8 | 20.0 | 19.8 | 20.2 | 20.1 | 20.4 | 20.0 | 20.6 |
| Cell Geometry (cpsi/mils) | — | 200/18 | — | — | — | — | — | — |
| MOR at 25° C. (psi) | — | 892 | — | — | — | — | — | — |
| Elastic Modulus at 25° C. ($10^6$ psi) | — | — | — | — | — | — | — | — |

TABLE 12

Properties of Inventive Examples 41-49

| | Example Number | | | | | | | | |
|---|---|---|---|---|---|---|---|---|---|
| | 41 | 42 | 43 | 44 | 45 | 46 | 47 | 48 | 49 |
| | | | | Composition Number | | | | | |
| | 19 | 19 | 19 | 20 | 21 | 22 | 23 | 24 | 24 |
| Firing Temperature (° C.) | 1420 | 1425 | 1430 | 1430 | 1430 | 1430 | 1425 | 1425 | 1425 |
| Hold Time (hours) | 30 | 30 | 30 | 30 | 30 | 30 | 30 | 15 | 30 |
| 1150-1200 Heating Rate (° C./hr) | 50 | 100 | 100 | 100 | 20 | 20 | 100 | 100 | 100 |
| 1200-1300 Heating Rate (° C./hr) | 50 | 100 | 100 | 100 | 50 | 50 | 100 | 100 | 100 |
| 1300-1360 Heating Rate (° C./hr) | 10 | 6 | 6 | 6 | 50 | 50 | 100 | 100 | 100 |
| 1360-Tmax Heating Rate (° C./hr) | 10 | 6 | 6 | 6 | 50 | 50 | 100 | 100 | 100 |
| CTE, 25-800 ($10^{-7}$/° C.) | 3.2 | 4.7 | 4.3 | 5.2 | — | 4.4 | 8.4 | 11.4 | 6.9 |
| Axial I-Ratio | — | 0.33 | — | — | — | 0.43 | 0.37 | 0.4 | 0.4 |
| Transverse I-Ratio | — | 0.88 | — | — | — | 0.87 | 0.87 | 0.81 | 0.85 |
| $P_c$ Parameter | 6.0 | 5.7 | 5.7 | 5.7 | 7.9 | 4.0 | 9.8 | 11.2 | 9.8 |
| $d_{50}$ of $Al_2O_3$-Forming Sources (μm) | 5.9 | 5.9 | 5.9 | 5.9 | 5.2 | 7.6 | 9.2 | 9.2 | 9.2 |
| $d_{50}$ of Talc Sources (μm) | 23.0 | 23.0 | 23.0 | 23.0 | 23.0 | 23.0 | 6.5 | 23.0 | 23.0 |
| $d_{50}$ of Silica-Forming Sources (μm) | 23.0 | 23.0 | 23.0 | 25.0 | 25.0 | 25.0 | 25.0 | 3.5 | 3.5 |
| $d_{50}$ of Talc + Silica-Forming Sources (μm) | 23.0 | 23.0 | 23.0 | 23.7 | 23.7 | 23.5 | 12.6 | 16.6 | 16.6 |
| Weight % Pore Formers | 10.0 | 10.0 | 10.0 | 10.0 | 15.0 | 0 | 0 | 0 | 0 |
| Weight % Kaolin Sources | 0 | 0 | 0 | 0 | 0 | 0 | 0 | 0 | 0 |
| % Porosity | 50 | 47 | 47 | 48 | 52 | 43 | 42 | 43 | 47 |
| $d_1$ (μm) | 5.9 | 6.1 | 5.7 | 6.5 | 5.6 | 1.5 | — | 7.5 | — |
| $d_5$ (μm) | 7.7 | 7.7 | 7.4 | 8.3 | 9.7 | 6.5 | — | 9.5 | — |
| $d_{10}$ (μm) | 9.2 | 9.1 | 8.7 | 9.5 | 11.3 | 8.2 | 8.5 | 11.0 | 9.8 |
| $d_{50}$ (μm) | 16.7 | 15.4 | 14.6 | 14.9 | 18.0 | 14.6 | 13.6 | 16.5 | 17.1 |
| $d_{90}$ (μm) | 33.3 | 26.5 | 24.1 | 23.7 | 34.5 | 27.4 | 27.8 | 29.1 | 32.5 |
| $d_{95}$ (μm) | 57.2 | 40.4 | 37.2 | 38.2 | 55.4 | 43.1 | — | 50.6 | — |
| $d_{99}$ (μm) | 184 | 167 | 143 | 143 | 158 | 140 | — | 179 | — |
| $d_f = (d_{50} - d_{10})/d_{50}$ | 0.45 | 0.41 | 0.41 | 0.36 | 0.37 | 0.44 | 0.37 | 0.33 | 0.43 |
| $d_b = (d_{90} - d_{10})/d_{50}$ | 1.45 | 1.13 | 1.06 | 0.96 | 1.29 | 1.31 | 1.42 | 1.10 | 1.33 |
| % Total Pore Volume <10 μm | 13.4 | 14.3 | 16.5 | 12.5 | 5.8 | 18.0 | 18.4 | 6.4 | 10.5 |
| % Total Pore Volume >30 μm | 11.8 | 7.8 | 6.8 | 6.7 | 12.9 | 8.5 | 9.1 | 9.6 | 11.3 |
| $P_{10}$ Parameter | 20.2 | 20.6 | 20.6 | 20.8 | 23.8 | 19.0 | 20.0 | 20.9 | 20.9 |
| Cell Geometry (cpsi/mils) | 275/12 | — | — | — | — | 200/18 | — | — | — |
| MOR at 25° C. (psi) | 729 | — | — | — | — | 1032 | — | — | — |
| Elastic Modulus at 25° C. ($10^6$ psi) | 0.98 | — | — | — | — | 1.18 | — | — | — |
| MOR/E (%) | 0.074 | — | — | — | — | 0.087 | — | — | — |

TABLE 13

Properties of Inventive Examples 50-56

| | Example Number | | | | | | |
|---|---|---|---|---|---|---|---|
| | 50 | 51 | 52 | 53 | 54 | 55 | 56 |
| | | | | Composition Number | | | |
| | 25 | 25 | 26 | 26 | 26 | 27 | 19 |
| Firing Temperature (° C.) | 1425 | 1425 | 1425 | 1425 | 1425 | 1415 | 1410 |
| Hold Time (hours) | 15 | 30 | 22.5 | 15 | 30 | 15 | 11 |
| 1150-1200 Heating Rate (° C./hr) | 100 | 100 | 47 | 100 | 100 | 50 | 25 |

TABLE 13-continued

Properties of Inventive Examples 50-56

| | Example Number | | | | | | |
|---|---|---|---|---|---|---|---|
| | 50 | 51 | 52 | 53 | 54 | 55 | 56 |
| | Composition Number | | | | | | |
| | 25 | 25 | 26 | 26 | 26 | 27 | 19 |
| 1200-1300 Heating Rate (° C./hr) | 100 | 100 | 47 | 100 | 100 | 28 | 25 |
| 1300-1360 Heating Rate (° C./hr) | 100 | 100 | 47 | 100 | 100 | 28 | 25 |
| 1360-Tmax Heating Rate (° C./hr) | 100 | 100 | 47 | 100 | 100 | 28 | 5 |
| CTE, 25-800 ($10^{-7}$/° C.) | 12.3 | 11.0 | 10.2 | 11.5 | 13.2 | 11.4 | 5.6 |
| Axial I-Ratio | 0.42 | 0.42 | 0.34 | 0.37 | 0.36 | 0.45 | — |
| Transverse I-Ratio | 0.86 | 0.86 | 0.89 | 0.88 | 0.89 | 0.85 | — |
| $P_c$ Parameter | 12.0 | 10.5 | 8.1 | 11.2 | 9.8 | 11.4 | 8.9 |
| $d_{50}$ of $Al_2O_3$-Forming Sources (μm) | 9.3 | 9.3 | 9.3 | 9.3 | 9.3 | 9.3 | 5.9 |
| $d_{50}$ of Talc Sources (μm) | 6.5 | 6.5 | 23.0 | 23.0 | 23.0 | 28.0 | 23.0 |
| $d_{50}$ of Silica-Forming Sources (μm) | 3.5 | 3.5 | 23.0 | 23.0 | 23.0 | 35.0 | 23.0 |
| $d_{50}$ of Talc + Silica-Forming Sources (μm) | 5.4 | 5.4 | 23.0 | 23.0 | 23.0 | 30.3 | 23.0 |
| Weight % Pore Formers | 5.0 | 5.0 | 0 | 0 | 0 | 20.0 | 10.0 |
| Weight % Kaolin Sources | 0 | 0 | 0 | 0 | 0 | 0 | 0 |
| % Porosity | 46 | 47 | 44 | 43 | 41 | 52 | 51 |
| $d_1$ (μm) | 6.6 | 5.8 | 6.2 | 8.5 | 7.6 | 0.2 | 9.6 |
| $d_5$ (μm) | 7.8 | 7.6 | 8.0 | 11.2 | 9.5 | 7.6 | 13.4 |
| $d_{10}$ (μm) | 8.7 | 8.7 | 9.4 | 12.7 | 10.6 | 9.0 | 14.8 |
| $d_{50}$ (μm) | 11.4 | 12.5 | 15.2 | 18.1 | 15.0 | 14.9 | 20.9 |
| $d_{90}$ (μm) | 14.9 | 19.0 | 28.4 | 30.1 | 28.0 | 26.1 | 34.3 |
| $d_{95}$ (μm) | 36.7 | 35.7 | 49.4 | 44.8 | 56.1 | 46.5 | 52.2 |
| $d_{99}$ (μm) | 218 | 196 | 209 | 145 | 208 | 156 | 127 |
| $d_f = (d_{50} - d_{10})/d_{50}$ | 0.23 | 0.31 | 0.38 | 0.30 | 0.29 | 0.40 | 0.29 |
| $d_b = (d_{90} - d_{10})/d_{50}$ | 0.54 | 0.83 | 1.25 | 0.96 | 1.16 | 1.15 | 0.93 |
| % Total Pore Volume <10 μm | 23.4 | 19.7 | 12.7 | 2.3 | 6.9 | 15.0 | 1.1 |
| % Total Pore Volume >30 μm | 5.6 | 5.6 | 9.3 | 10.0 | 9.2 | 8.2 | 13.2 |
| $P_{10}$ Parameter | 19.1 | 19.1 | 20.7 | 22.9 | 22.9 | 26.6 | 20.4 |
| Cell Geometry (cpsi/mils) | — | — | — | — | — | — | 275/14 |
| MOR at 25° C. (psi) | — | — | — | — | — | — | 458 |
| Elastic Modulus at 25° C. ($10^6$ psi) | — | — | — | — | — | — | 0.76 |

TABLE 14

Pore Size Distributions for Inventive Examples 1-8

| | Example Number | | | | | | | |
|---|---|---|---|---|---|---|---|---|
| | 1 | 2 | 3 | 4 | 5 | 6 | 7 | 8 |
| | Composition Number | | | | | | | |
| | 1 | 1 | 2 | 3 | 3 | 3 | 3 | 4 |
| Total Pore Volume (ml/g) | 0.3924 | 0.4065 | 0.3012 | 0.2889 | 0.2590 | 0.2818 | 0.3048 | 0.3181 |
| % Pore Volume <1 μm | 0.9 | 0.7 | 1.1 | 0.8 | 0.3 | 0.9 | 0.1 | 0.7 |
| % Pore Volume <2 μm | 0.9 | 1.0 | 1.2 | 0.8 | 0.3 | 0.9 | 0.2 | 0.8 |
| % Pore Volume <3 μm | 1.0 | 1.3 | 1.4 | 0.8 | 0.3 | 0.9 | 0.3 | 1.0 |
| % Pore Volume <4 μm | 1.2 | 1.7 | 1.8 | 0.8 | 0.3 | 0.9 | 0.4 | 1.3 |
| % Pore Volume <5 μm | 2.1 | 2.4 | 2.8 | 0.8 | 0.3 | 0.9 | 0.4 | 1.7 |
| % Pore Volume <6 μm | 3.3 | 3.5 | 3.1 | 0.8 | 0.3 | 0.9 | 0.5 | 2.8 |
| % Pore Volume <7 μm | 5.3 | 5.5 | 5.6 | 1.2 | 0.4 | 1.8 | 1.0 | 4.7 |
| % Pore Volume <8 μm | 8.0 | 8.1 | 9.0 | 2.1 | 0.6 | 3.9 | 2.3 | 6.9 |
| % Pore Volume <9 μm | 11.1 | 11.1 | 13.2 | 4.2 | 1.0 | 7.8 | 4.9 | 9.5 |
| % Pore Volume <10 μm | 15.0 | 14.9 | 18.5 | 8.0 | 1.7 | 13.3 | 8.4 | 12.5 |
| % Pore Volume <15 μm | 44.7 | 43.4 | 50.3 | 55.2 | 22.5 | 66.3 | 44.2 | 38.8 |
| % Pore Volume <20 μm | 73.8 | 75.1 | 81.3 | 83.6 | 72.3 | 86.3 | 80.5 | 72.8 |
| % Pore Volume <25 μm | 83.6 | 86.2 | 84.3 | 87.4 | 86.2 | 90.6 | 88.3 | 84.7 |
| % Pore Volume <30 μm | 88.0 | 90.4 | 87.4 | 88.9 | 90.4 | 92.6 | 91.0 | 88.9 |
| % Pore Volume <40 μm | 92.2 | 94.0 | 93.1 | 94.0 | 93.8 | 94.7 | 93.7 | 92.9 |
| % Pore Volume <50 μm | 94.0 | 95.4 | 94.4 | 95.2 | 95.1 | 95.8 | 95.0 | 94.6 |
| % Pore Volume <60 μm | 95.3 | 96.4 | 95.6 | 96.2 | 96.3 | 96.7 | 96.1 | 95.9 |
| % Pore Volume <70 μm | 96.0 | 97.0 | 96.4 | 96.8 | 96.9 | 97.2 | 96.7 | 96.6 |
| % Pore Volume <80 μm | 96.6 | 97.5 | 97.1 | 97.2 | 97.4 | 97.7 | 97.1 | 97.1 |
| % Pore Volume <90 μm | 97.1 | 97.8 | 97.5 | 97.6 | 97.8 | 98.0 | 97.5 | 97.5 |
| % Pore Volume <100 μm | 97.4 | 98.1 | 97.8 | 97.8 | 98.1 | 98.2 | 97.8 | 97.8 |

TABLE 15

Pore Size Distributions for Inventive Examples 9-16

| | Example Number | | | | | | |
|---|---|---|---|---|---|---|---|
| | 9 | 10 | 11 | 12 | 13 | 14 | 15 | 16 |
| | Composition Number | | | | | | |
| | 5 | 5 | 6 | 6 | 7 | 8 | 9 | 9 |
| Total Pore Volume (ml/g) | 0.4454 | 0.4141 | 0.4495 | 0.4302 | 0.3478 | 0.3366 | 0.2975 | 0.3055 |
| % Pore Volume <1 μm | 0.0 | 0.3 | 0.1 | 0.0 | 0.2 | 0.4 | 0.2 | 0.7 |
| % Pore Volume <2 μm | 0.3 | 0.5 | 0.6 | 0.3 | 0.7 | 0.9 | 0.8 | 0.8 |
| % Pore Volume <3 μm | 0.6 | 0.8 | 1.0 | 0.7 | 1.2 | 1.3 | 1.2 | 0.8 |
| % Pore Volume <4 μm | 1.1 | 1.2 | 1.4 | 1.0 | 1.7 | 1.9 | 1.8 | 0.9 |
| % Pore Volume <5 μm | 2.1 | 1.6 | 2.1 | 1.4 | 2.5 | 2.7 | 2.3 | 1.2 |
| % Pore Volume <6 μm | 3.5 | 2.3 | 3.5 | 1.8 | 3.9 | 3.4 | 2.9 | 2.1 |
| % Pore Volume <7 μm | 5.6 | 3.8 | 5.3 | 2.9 | 5.9 | 5.1 | 4.8 | 4.2 |
| % Pore Volume <8 μm | 8.5 | 6.4 | 7.7 | 4.8 | 8.7 | 8.3 | 7.3 | 6.8 |
| % Pore Volume <9 μm | 12.1 | 9.8 | 10.8 | 7.5 | 12.4 | 12.4 | 10.5 | 9.9 |
| % Pore Volume <10 μm | 16.2 | 14.1 | 14.4 | 11.1 | 16.8 | 17.1 | 14.2 | 13.6 |
| % Pore Volume <15 μm | 46.1 | 45.7 | 40.0 | 40.2 | 48.2 | 52.6 | 47.2 | 45.1 |
| % Pore Volume <20 μm | 77.5 | 76.2 | 72.0 | 73.4 | 77.9 | 82.0 | 80.6 | 76.6 |
| % Pore Volume <25 μm | 88.4 | 87.4 | 85.5 | 87.5 | 87.0 | 89.3 | 88.1 | 86.0 |
| % Pore Volume <30 μm | 92.2 | 91.1 | 90.1 | 91.9 | 90.9 | 92.3 | 91.2 | 89.5 |
| % Pore Volume <40 μm | 95.2 | 94.3 | 93.9 | 95.3 | 95.0 | 95.0 | 94.0 | 93.2 |
| % Pore Volume <50 μm | 96.4 | 95.7 | 95.4 | 96.8 | 96.3 | 96.1 | 95.3 | 94.8 |
| % Pore Volume <60 μm | 97.3 | 96.7 | 96.5 | 97.7 | 97.6 | 97.1 | 96.2 | 95.9 |
| % Pore Volume <70 μm | 97.8 | 97.3 | 97.1 | 98.2 | 98.1 | 97.6 | 96.7 | 96.6 |
| % Pore Volume <80 μm | 98.3 | 97.7 | 97.6 | 98.6 | 98.6 | 98.0 | 97.2 | 97.1 |
| % Pore Volume <90 μm | 98.5 | 98.1 | 97.9 | 98.9 | 98.8 | 98.3 | 97.5 | 97.5 |
| % Pore Volume <100 μm | 98.8 | 98.3 | 98.2 | 99.1 | 99.1 | 98.5 | 97.8 | 97.8 |

TABLE 16

Pore Size Distributions for Inventive Examples 17-24

| | Example Number | | | | | | |
|---|---|---|---|---|---|---|---|
| | 17 | 18 | 19 | 20 | 21 | 22 | 23 | 24 |
| | Composition Number | | | | | | |
| | 9 | 9 | 10 | 11 | 11 | 11 | 12 | 13 |
| Total Pore Volume (ml/g) | 0.2825 | 0.3028 | 0.3712 | 0.3436 | 0.3240 | 0.2793 | 0.3582 | 0.3905 |
| % Pore Volume <1 μm | 0.3 | 0.1 | 0.2 | 0.1 | 0.6 | 0.3 | 0.9 | 0.0 |
| % Pore Volume <2 μm | 0.4 | 0.1 | 0.3 | 0.1 | 0.6 | 0.3 | 1.0 | 0.3 |
| % Pore Volume <3 μm | 0.5 | 0.3 | 0.5 | 0.1 | 0.6 | 0.3 | 1.2 | 0.6 |
| % Pore Volume <4 μm | 0.7 | 0.4 | 0.9 | 0.4 | 0.6 | 0.3 | 1.5 | 1.0 |
| % Pore Volume <5 μm | 0.8 | 0.4 | 1.7 | 0.9 | 0.6 | 0.3 | 1.8 | 1.5 |
| % Pore Volume <6 μm | 0.8 | 0.7 | 3.1 | 2.2 | 0.6 | 0.3 | 2.5 | 2.2 |
| % Pore Volume <7 μm | 1.7 | 2.2 | — | 4.1 | 1.0 | 0.5 | 3.8 | 4.2 |
| % Pore Volume <8 μm | 3.5 | 4.3 | — | 6.4 | 2.2 | 0.7 | 5.7 | 7.2 |
| % Pore Volume <9 μm | 5.9 | 6.9 | — | 9.1 | 4.2 | 1.2 | 8.1 | 11.0 |
| % Pore Volume <10 μm | 8.9 | 9.9 | 11.8 | 12.5 | 6.8 | 2.0 | 11.1 | 15.7 |
| % Pore Volume <15 μm | 35.5 | 37.8 | 35.7 | 41.0 | 32.6 | 22.0 | 36.7 | 53.0 |
| % Pore Volume <20 μm | 75.1 | 73.9 | 73.9 | 76.2 | 73.2 | 67.9 | 76.4 | 80.8 |
| % Pore Volume <25 μm | 86.3 | 85.1 | 85.7 | 85.6 | 85.2 | 83.1 | 88.1 | 87.6 |
| % Pore Volume <30 μm | 90.1 | 89.0 | 89.5 | 89.5 | 89.5 | 88.0 | 91.3 | 90.4 |
| % Pore Volume <40 μm | 93.2 | 92.6 | 92.8 | 93.2 | 93.4 | 92.1 | 94.3 | 93.1 |
| % Pore Volume <50 μm | 94.5 | 94.1 | 94.1 | 94.7 | 95.0 | 94.0 | 95.5 | 94.3 |
| % Pore Volume <60 μm | 95.5 | 95.2 | 95.3 | 96.0 | 96.1 | 95.3 | 96.5 | 95.2 |
| % Pore Volume <70 μm | 96.0 | 95.8 | 95.9 | 96.7 | 96.8 | 96.0 | 97.0 | 95.8 |
| % Pore Volume <80 μm | 96.4 | 96.4 | 96.4 | 97.3 | 97.3 | 96.6 | 97.5 | 96.4 |
| % Pore Volume <90 μm | 96.7 | 96.7 | 96.7 | 97.7 | 97.7 | 97.1 | 97.9 | 96.7 |
| % Pore Volume <100 μm | 97.0 | 97.1 | 97.1 | 98.0 | 98.0 | 97.4 | 98.1 | 97.0 |

TABLE 17

Pore Size Distributions for Inventive Examples 25-32

| | Example Number | | | | | | | |
|---|---|---|---|---|---|---|---|---|
| | 25 | 26 | 27 | 28 | 29 | 30 | 31 | 32 |
| | Composition Number | | | | | | | |
| | 14 | 14 | 15 | 16 | 16 | 16 | 16 | 17 |
| Total Pore Volume (ml/g) | 0.4505 | 0.4407 | 0.4246 | 0.3197 | 0.2945 | 0.2850 | 0.2786 | 0.2951 |
| % Pore Volume <1 µm | 0.0 | 0.4 | 0.2 | 0.0 | 0.7 | 0.3 | 0.0 | 0.2 |
| % Pore Volume <2 µm | 0.2 | 0.6 | 0.5 | 0.0 | 0.7 | 0.3 | 0.0 | 0.5 |
| % Pore Volume <3 µm | 0.4 | 0.8 | 0.9 | 0.0 | 0.7 | 0.5 | 0.0 | 0.7 |
| % Pore Volume <4 µm | 0.7 | 1.1 | 1.3 | 0.0 | 0.7 | 0.8 | 0.0 | 1.0 |
| % Pore Volume <5 µm | 1.3 | 1.6 | 2.1 | 0.2 | 0.7 | 1.2 | 0.0 | 1.7 |
| % Pore Volume <6 µm | 2.4 | 2.0 | 3.7 | 1.4 | 0.9 | 1.5 | 0.0 | 2.8 |
| % Pore Volume <7 µm | 3.8 | 2.4 | 5.8 | 3.9 | 2.4 | 3.4 | 0.5 | — |
| % Pore Volume <8 µm | 5.7 | 3.1 | 8.7 | 7.3 | 5.3 | 6.8 | 1.9 | — |
| % Pore Volume <9 µm | 7.7 | 4.3 | 12.7 | 11.4 | 9.4 | 11.4 | 4.6 | — |
| % Pore Volume <10 µm | 10.3 | 5.8 | 17.6 | 16.1 | 14.5 | 17.0 | 8.4 | 16.5 |
| % Pore Volume <15 µm | 32.7 | 21.8 | 50.8 | 44.8 | 49.6 | 52.7 | 39.5 | 51.2 |
| % Pore Volume <20 µm | 70.3 | 55.5 | 82.3 | 70.3 | 79.1 | 81.4 | 73.8 | 79.7 |
| % Pore Volume <25 µm | 85.6 | 79.9 | 89.6 | 82.1 | 88.3 | 90.1 | 85.9 | 87.6 |
| % Pore Volume <30 µm | 90.1 | 87.3 | 92.5 | 87.4 | 91.7 | 93.5 | 90.1 | 90.8 |
| % Pore Volume <40 µm | 93.7 | 92.2 | 95.0 | 92.2 | 95.0 | 96.4 | 93.7 | 93.9 |
| % Pore Volume <50 µm | 95.2 | 94.2 | 96.2 | 94.2 | 96.4 | 97.5 | 95.1 | 95.3 |
| % Pore Volume <60 µm | 96.2 | 95.4 | 97.0 | 95.6 | 97.3 | 98.5 | 96.3 | 96.3 |
| % Pore Volume <70 µm | 96.8 | 96.1 | 97.5 | 96.4 | 97.8 | 98.9 | 96.9 | 96.8 |
| % Pore Volume <80 µm | 97.3 | 96.7 | 98.0 | 97.0 | 98.3 | 99.3 | 97.4 | 97.3 |
| % Pore Volume <90 µm | 97.6 | 97.2 | 98.2 | 97.5 | 98.6 | 99.4 | 97.7 | 97.6 |
| % Pore Volume <100 µm | — | — | 98.5 | 97.8 | 98.9 | 99.6 | 98.0 | 97.9 |

TABLE 18

Pore Size Distributions for Inventive Examples 33-40

| | Example Number | | | | | | | |
|---|---|---|---|---|---|---|---|---|
| | 33 | 34 | 35 | 36 | 37 | 38 | 39 | 40 |
| | Composition Number | | | | | | | |
| | 17 | 18 | 18 | 18 | 19 | 19 | 19 | 19 |
| Total Pore Volume (ml/g) | 0.2630 | 0.3512 | 0.3156 | 0.3133 | 0.3946 | 0.4182 | 0.4200 | 0.3503 |
| % Pore Volume <1 µm | 0.2 | 0.0 | 0.1 | 0.1 | 0.0 | 0.0 | 0.1 | 0.0 |
| % Pore Volume <2 µm | 0.3 | 0.0 | 0.3 | 0.1 | 0.1 | 0.1 | 0.1 | 0.0 |
| % Pore Volume <3 µm | 0.3 | 0.0 | 0.5 | 0.1 | 0.2 | 0.1 | 0.1 | 0.1 |
| % Pore Volume <4 µm | 0.4 | 0.0 | 0.7 | 0.1 | 0.3 | 0.1 | 0.3 | 0.2 |
| % Pore Volume <5 µm | 0.6 | 0.0 | 1.0 | 0.1 | 0.8 | 0.1 | 0.6 | 0.3 |
| % Pore Volume <6 µm | 0.7 | 0.0 | 1.5 | 0.1 | 2.2 | 0.1 | 0.9 | 0.5 |
| % Pore Volume <7 µm | 1.1 | 0.7 | 3.6 | 1.2 | 5.3 | 0.4 | 2.2 | — |
| % Pore Volume <8 µm | 2.5 | 2.3 | 7.6 | 3.5 | 9.1 | 1.0 | 4.6 | — |
| % Pore Volume <9 µm | 4.7 | 5.0 | 12.7 | 7.5 | 13.3 | 2.5 | 7.9 | — |
| % Pore Volume <10 µm | 8.9 | 8.3 | 18.9 | 12.4 | 17.8 | 4.9 | 12.0 | 12.1 |
| % Pore Volume <15 µm | 48.4 | 34.8 | 56.4 | 49.6 | 45.9 | 29.3 | 41.4 | 50.9 |
| % Pore Volume <20 µm | 81.4 | 67.9 | 82.8 | 80.3 | 75.8 | 67.7 | 71.4 | 80.1 |
| % Pore Volume <25 µm | 89.2 | 82.2 | 89.3 | 89.1 | 86.7 | 85.2 | 85.0 | 88.1 |
| % Pore Volume <30 µm | 92.2 | 88.6 | 92.0 | 92.3 | 90.5 | 90.2 | 89.9 | 91.0 |
| % Pore Volume <40 µm | 95.0 | 93.6 | 94.5 | 95.1 | 93.6 | 93.9 | 93.9 | 93.9 |
| % Pore Volume <50 µm | 96.2 | 95.2 | 95.6 | 96.2 | 95.0 | 95.2 | 95.5 | 95.2 |
| % Pore Volume <60 µm | 97.0 | 96.7 | 96.6 | 97.2 | 96.0 | 96.2 | 96.7 | 96.3 |
| % Pore Volume <70 µm | 97.5 | 97.3 | 97.1 | 97.7 | 96.5 | 96.8 | 97.3 | 96.8 |
| % Pore Volume <80 µm | 97.9 | 98.0 | 97.6 | 98.1 | 97.0 | 97.3 | 98.0 | 97.4 |
| % Pore Volume <90 µm | 98.2 | 98.3 | 97.9 | 98.3 | 97.3 | 97.6 | 98.3 | 97.7 |
| % Pore Volume <100 µm | 98.4 | 98.6 | 98.2 | 98.6 | 97.6 | 97.8 | 98.6 | 98.0 |

TABLE 19

Pore Size Distributions for Inventive Examples 41-49

| | Example Number | | | | | | | | |
|---|---|---|---|---|---|---|---|---|---|
| | 41 | 42 | 43 | 44 | 45 | 46 | 47 | 48 | 49 |
| | Composition Number | | | | | | | | |
| | 19 | 19 | 19 | 20 | 21 | 22 | 23 | 24 | 24 |
| Total Pore Volume (ml/g) | 0.4096 | 0.3584 | 0.3712 | 0.3653 | 0.4344 | 0.2840 | 0.2962 | 0.3038 | 0.3625 |
| % Pore Volume <1 μm | 0.0 | 0.1 | 0.1 | 0.1 | 0.4 | 0.6 | 0.3 | 0.0 | 0.0 |
| % Pore Volume <2 μm | 0.0 | 0.1 | 0.1 | 0.1 | 0.4 | 1.2 | 0.4 | 0.0 | 0.1 |
| % Pore Volume <3 μm | 0.0 | 0.2 | 0.1 | 0.1 | 0.4 | 1.8 | 0.5 | 0.0 | 0.1 |
| % Pore Volume <4 μm | 0.0 | 0.3 | 0.2 | 0.2 | 0.6 | 2.3 | 0.6 | 0.0 | 0.6 |
| % Pore Volume <5 μm | 0.2 | 0.5 | 0.5 | 0.3 | 0.9 | 2.7 | 0.9 | 0.0 | 1.2 |
| % Pore Volume <6 μm | 1.1 | 0.9 | 1.2 | 0.4 | 1.1 | 3.7 | 1.3 | 0.0 | 2.4 |
| % Pore Volume <7 μm | 3.1 | 2.9 | 3.5 | 1.6 | 1.4 | 6.2 | — | 0.4 | — |
| % Pore Volume <8 μm | 5.8 | 5.9 | 7.1 | 4.0 | 2.1 | 9.3 | — | 1.6 | — |
| % Pore Volume <9 μm | 9.3 | 9.8 | 11.5 | 7.7 | 3.5 | 13.2 | — | 3.6 | — |
| % Pore Volume <10 μm | 13.4 | 14.3 | 16.5 | 12.5 | 5.8 | 18.0 | 18.4 | 6.4 | 10.5 |
| % Pore Volume <15 μm | 40.0 | 47.2 | 53.2 | 51.5 | 29.1 | 53.4 | 64.0 | 36.7 | 34.1 |
| % Pore Volume <20 μm | 67.2 | 80.1 | 83.7 | 84.0 | 63.0 | 80.8 | 84.2 | 73.5 | 69.9 |
| % Pore Volume <25 μm | 82.5 | 88.9 | 90.7 | 90.9 | 80.5 | 88.1 | 88.6 | 86.4 | 84.4 |
| % Pore Volume <30 μm | 88.2 | 92.2 | 93.2 | 93.3 | 87.1 | 91.5 | 90.9 | 90.4 | 88.7 |
| % Pore Volume <40 μm | 92.4 | 94.9 | 95.5 | 95.3 | 92.0 | 94.6 | 93.3 | 93.7 | 92.2 |
| % Pore Volume <50 μm | 94.2 | 95.9 | 96.4 | 96.2 | 94.2 | 95.9 | 94.4 | 94.9 | 93.6 |
| % Pore Volume <60 μm | 95.3 | 96.8 | 97.1 | 96.9 | 95.5 | 97.0 | 95.4 | 96.0 | 94.8 |
| % Pore Volume <70 μm | 96.0 | 97.3 | 97.5 | 97.4 | 96.3 | 97.5 | 95.9 | 96.6 | 95.4 |
| % Pore Volume <80 μm | 96.7 | 97.7 | 97.8 | 97.7 | 97.0 | 97.9 | 96.4 | 97.0 | 95.9 |
| % Pore Volume <90 μm | 97.1 | 97.9 | 98.2 | 98.0 | 97.4 | 98.1 | 96.7 | 97.4 | 96.3 |
| % Pore Volume <100 μm | 97.5 | 98.2 | 98.4 | 98.2 | 97.8 | 98.4 | 97.0 | 97.7 | 96.7 |

TABLE 20

Pore Size Distributions for Inventive Examples 50-56

| | Example Number | | | | | | |
|---|---|---|---|---|---|---|---|
| | 50 | 51 | 52 | 53 | 54 | 55 | 56 |
| | Composition Number | | | | | | |
| | 25 | 25 | 26 | 26 | 26 | 27 | 19 |
| Total Pore Volume (ml/g) | 0.3478 | 0.3490 | 0.3058 | 0.2973 | 0.2656 | 0.4262 | 0.4208 |
| % Pore Volume <1 μm | 0.0 | 0.1 | 0.0 | 0.1 | 0.0 | 1.1 | 0.2 |
| % Pore Volume <2 μm | 0.0 | 0.3 | 0.0 | 0.2 | 0.0 | 1.3 | 0.2 |
| % Pore Volume <3 μm | 0.0 | 0.4 | 0.2 | 0.3 | 0.0 | 1.4 | 0.3 |
| % Pore Volume <4 μm | 0.0 | 0.5 | 0.3 | 0.3 | 0.0 | 1.6 | 0.3 |
| % Pore Volume <5 μm | 0.0 | 0.6 | 0.5 | 0.4 | 0.0 | 1.8 | 0.5 |
| % Pore Volume <6 μm | 0.0 | 1.1 | 0.7 | 0.4 | 0.0 | 1.9 | 0.8 |
| % Pore Volume <7 μm | 1.7 | 3.1 | 2.6 | 0.5 | 0.5 | 3.5 | 0.8 |
| % Pore Volume <8 μm | 5.7 | 6.4 | 5.0 | 0.7 | 1.5 | 6.3 | 0.9 |
| % Pore Volume <9 μm | 11.9 | 11.7 | 8.5 | 1.3 | 3.2 | 10.1 | 0.9 |
| % Pore Volume <10 μm | 23.4 | 19.7 | 12.7 | 2.3 | 6.9 | 15.0 | 1.1 |
| % Pore Volume <15 μm | 90.2 | 74.7 | 48.1 | 22.6 | 50.0 | 50.9 | 10.8 |
| % Pore Volume <20 μm | 93.2 | 91.2 | 79.4 | 66.5 | 82.0 | 80.8 | 43.9 |
| % Pore Volume <25 μm | 93.9 | 93.6 | 87.5 | 84.6 | 88.3 | 89.3 | 77.1 |
| % Pore Volume <30 μm | 94.4 | 94.4 | 90.7 | 90.0 | 90.8 | 91.8 | 86.8 |
| % Pore Volume <40 μm | 95.3 | 95.4 | 93.8 | 94.1 | 93.3 | 94.3 | 92.5 |
| % Pore Volume <50 μm | 95.7 | 95.9 | 95.1 | 95.7 | 94.5 | 95.3 | 94.7 |
| % Pore Volume <60 μm | 96.1 | 96.3 | 96.1 | 96.7 | 95.3 | 96.2 | 96.1 |
| % Pore Volume <70 μm | 96.3 | 96.6 | 96.6 | 97.3 | 95.8 | 96.7 | 96.9 |
| % Pore Volume <80 μm | 96.6 | 96.9 | 97.1 | 97.8 | 96.3 | 97.2 | 97.6 |
| % Pore Volume <90 μm | 96.8 | 97.1 | 97.4 | 98.0 | 96.6 | 97.5 | 98.0 |
| % Pore Volume <100 μm | 97.0 | 97.4 | 97.6 | 98.3 | 96.9 | 97.8 | 98.4 |

TABLE 21

Properties of Comparative Examples C1-C8

| | Example Number | | | | | | | |
|---|---|---|---|---|---|---|---|---|
| | C1 | C2 | C3 | C4 | C5 | C6 | C7 | C8 |
| | Composition Number | | | | | | | |
| | C1 | C2 | C3 | C4 | C5 | C6 | C5 | C7 |
| Firing Temperature (° C.) | 1430 | 1410 | 1410 | 1410 | 1410 | 1405 | 1410 | 1410 |
| Hold Time (hours) | 6 | 11 | 11 | 11 | 11 | 11 | 11 | 11 |
| 1150-1200 Heating Rate (° C./hr) | 40 | 25 | 25 | 25 | 25 | 25 | 25 | 25 |
| 1200-1300 Heating Rate (° C./hr) | 28 | 25 | 25 | 25 | 25 | 25 | 25 | 25 |
| 1300-1360 Heating Rate (° C./hr) | 28 | 25 | 25 | 25 | 25 | 25 | 25 | 25 |
| 1360-Tmax Heating Rate (° C./hr) | 28 | 5 | 5 | 5 | 5 | 5 | 5 | 5 |
| CTE, 25-800 ($10^{-7}$/° C.) | 1.8 | 6.4 | 6.6 | 3.7 | 3.5 | 4.7 | — | 8.1 |
| Axial I-Ratio | — | 0.43 | 0.41 | 0.36 | — | 0.36 | — | 0.48 |
| Transverse I-Ratio | — | 0.83 | 0.84 | 0.87 | — | 0.84 | — | 0.81 |
| $d_{50}$ of $Al_2O_3$-Forming Sources (μm) | 4.0 | 4.0 | 4.0 | 4.0 | 4.0 | 4.0 | 4.0 | 4.0 |
| $d_{50}$ of Talc Sources (μm) | 23.0 | 15.0 | 22.0 | 22.0 | 23.0 | 23.0 | 23.0 | 15.0 |
| $d_{50}$ of Silica-Forming Sources (μm) | 23.0 | 23.0 | 23.0 | 23.0 | 23.0 | 23.0 | 23.0 | 23.0 |
| $d_{50}$ of Talc + Silica-Forming Sources (μm) | 23.0 | 16.9 | 22.2 | 22.2 | 23.0 | 23.0 | 23.0 | 16.9 |
| Weight % Pore Formers | 0 | 20.0 | 20.0 | 20.0 | 20.0 | 20.0 | 20.0 | 40.0 |
| Weight % Kaolin Sources | 16.0 | 16.0 | 16.0 | 16.0 | 16.0 | 16.0 | 16.0 | 16.0 |
| % Porosity | 42.7 | 45.6 | 47.2 | 49.1 | 46.6 | 50.4 | 51 | 52.7 |
| $d_{10}$ (μm) | 1.9 | 3.5 | 3.0 | 2.2 | 2.0 | 5.1 | 2.8 | 4.1 |
| $d_{50}$ (μm) | 8.9 | 9.4 | 7.1 | 4.8 | 11.1 | 11.4 | 12.5 | 9.9 |
| $d_{90}$ (μm) | 30.8 | 27.4 | 15.4 | 11.3 | 31.2 | 28.3 | 33.0 | 35.0 |
| $d_f = (d_{50} - d_{10})/d_{50}$ | 0.79 | 0.63 | 0.58 | 0.54 | 0.82 | 0.55 | 0.78 | 0.59 |
| $d_b = (d_{90} - d_{10})/d_{50}$ | 3.25 | 2.54 | 1.75 | 1.90 | 2.63 | 2.04 | 2.42 | 3.12 |
| % Total Pore Volume <10 μm | 56.5 | 53.7 | 77.3 | 88.2 | — | 39.5 | — | 50.4 |
| % Total Pore Volume >30 μm | — | 8.9 | 4.1 | 3.9 | — | 9.4 | — | 12.1 |
| $P_{10}$ | 15.2 | 14.0 | 15.3 | 15.3 | 15.5 | 15.5 | 15.5 | 14.6 |

TABLE 22

Properties of Comparative Examples C9-C16

| | Example Number | | | | | | | |
|---|---|---|---|---|---|---|---|---|
| | C9 | C10 | C11 | C12 | C13 | C14 | C15 | C16 |
| | Composition Number | | | | | | | |
| | C8 | C9 | C10 | C11 | C12 | C13 | C14 | C15 |
| Firing Temperature (° C.) | 1410 | 1400 | 1400 | 1400 | 1400 | 1400 | 1400 | 1420 |
| Hold Time (hours) | 11 | 7 | 7 | 7 | 7 | 7 | 7 | 15 |
| 1150-1200 Heating Rate (° C./hr) | 25 | 23 | 23 | 23 | 23 | 23 | 23 | 22 |
| 1200-1300 Heating Rate (° C./hr) | 25 | 23 | 23 | 23 | 23 | 23 | 23 | 48 |
| 1300-1360 Heating Rate (° C./hr) | 25 | 23 | 23 | 23 | 23 | 23 | 23 | 48 |
| 1360-Tmax Heating Rate (° C./hr) | 5 | 8 | 8 | 8 | 8 | 8 | 8 | 48 |
| CTE, 25-800 ($10^{-7}$/° C.) | 8.6 | 2.7 | 0.9 | 1.2 | 3.4 | 6.2 | 6.1 | — |
| Axial I-Ratio | 0.46 | — | — | — | — | 0.51 | — | — |
| Transverse I-Ratio | 0.81 | 0.90 | 0.90 | 0.90 | 0.88 | 0.81 | 0.84 | — |
| $d_{50}$ of $Al_2O_3$-Forming Sources (μm) | 4.0 | 5.7 | 5.7 | 5.7 | 5.7 | 5.7 | 5.7 | 9.9 |
| $d_{50}$ of Talc Sources (μm) | 22.0 | 23.0 | 27.0 | 27.0 | 23.0 | 19.0 | 19.0 | 23.0 |
| $d_{50}$ of Silica-Forming Sources (μm) | 23.0 | 20.0 | 20.0 | 20.0 | 20.0 | 3.5 | 20.0 | 23.0 |
| $d_{50}$ of Talc + Silica-Forming Sources (μm) | 22.2 | 22.3 | 25.3 | 25.4 | 22.3 | 15.3 | 19.2 | 23.0 |
| Weight % Pore Formers | 40.0 | 0 | 0 | 0 | 10.0 | 15.0 | 15.0 | 0 |
| Weight % Kaolin | 16.0 | 16.6 | 16.6 | 16.0 | 16.6 | 16.6 | 16.6 | 16.0 |
| % Porosity | 52.7 | 42.4 | 42.9 | 43.5 | 51.5 | 48.4 | 50.0 | 42.0 |
| $d_{10}$ (μm) | 3.7 | 3.1 | 4.2 | 3.7 | 4.1 | 2.3 | 4.1 | 7.3 |
| $d_{50}$ (μm) | 8.4 | 9.4 | 12.3 | 12.1 | 10.9 | 11.0 | 15.0 | 13.6 |
| $d_{90}$ (μm) | 35.1 | 22.3 | 35.8 | 29.6 | 22.4 | 29.9 | 33.0 | 26.9 |
| $d_f = (d_{50} - d_{10})/d_{50}$ | 0.56 | 0.67 | 0.66 | 0.69 | 0.62 | 0.80 | 0.73 | 0.46 |
| $d_b = (d_{90} - d_{10})/d_{50}$ | 3.74 | 2.04 | 2.57 | 2.14 | 1.68 | 2.51 | 1.93 | 1.44 |
| % Total Pore Volume <10 μm | 57.6 | 57.7 | 37.1 | 39.1 | 44.2 | 46.1 | 27.6 | 22.7 |
| % Total Pore Volume >30 μm | 11.8 | 6.3 | 12.0 | 9.7 | 6.2 | 9.9 | 11.6 | 8.5 |
| $P_{10}$ | 15.9 | 14.8 | 15.6 | 15.7 | 15.5 | 13.4 | 14.4 | 18.3 |

TABLE 23

Properties of Comparative Examples C17-C24

| | Example Number | | | | | | | |
|---|---|---|---|---|---|---|---|---|
| | C17 | C18 | C19 | C20 | C21 | C22 | C23 | C24 |
| | | | | Composition Number | | | | |
| | C16 | C17 | C18 | C19 | C20 | C21 | C22 | C23 |
| Firing Temperature (° C.) | 1400 | 1410 | 1400 | 1400 | 1415 | 1430 | 1430 | 1430 |
| Hold Time (hours) | 7 | 11 | 7 | 7 | 25 | 6 | 6 | 6 |
| 1150-1200 Heating Rate (° C./hr) | 23 | 25 | 23 | 23 | 25 | 40 | 40 | 40 |
| 1200-1300 Heating Rate (° C./hr) | 23 | 25 | 23 | 23 | 25 | 28 | 28 | 28 |
| 1300-1360 Heating Rate (° C./hr) | 23 | 25 | 23 | 23 | 25 | 28 | 28 | 28 |
| 1360-Tmax Heating Rate (° C./hr) | 8 | 5 | 8 | 8 | 5 | 28 | 28 | 28 |
| CTE, 25-800 ($10^{-7}$/° C.) | 1.4 | 6.3 | 3.3 | 5.1 | 2.5 | 11.5 | 16.7 | 14.8 |
| Axial I-Ratio | — | — | — | 0.50 | 0.31 | — | — | — |
| Transverse I-Ratio | 0.89 | — | 0.88 | 0.87 | 0.94 | 0.83 | — | — |
| $d_{50}$ of $Al_2O_3$-Forming Sources (μm) | 2.9 | 4.0 | 5.7 | 5.7 | 5.9 | 5.5 | 5.1 | 5.1 |
| $d_{50}$ of Talc Sources (μm) | 23.0 | 69.0 | 38.0 | 19.0 | 5.0 | 69.0 | 69.0 | 69.0 |
| $d_{50}$ of Silica-Forming Sources (μm) | 60.0 | 23.0 | 20.0 | 46.0 | 23.0 | 3.5 | 3.5 | 21.0 |
| $d_{50}$ of Talc + Silica-Forming Sources (μm) | 31.7 | 58.2 | 33.7 | 25.5 | 11.4 | 45.1 | 45.1 | 51.5 |
| Weight % Pore Formers | 0 | 20.0 | 0 | 15.0 | 0 | 0 | 0 | 0 |
| Weight % Kaolin | 16.0 | 16.0 | 16.6 | 16.6 | 0 | 0 | 0 | 0 |
| % Porosity | 46.6 | 47.3 | 44.8 | 49.0 | 48.0 | 52.3 | 38.9 | 38.8 |
| $d_{10}$ (μm) | 3.7 | 12.4 | 3.1 | 6.1 | 3.5 | 6.0 | 14.5 | 16.2 |
| $d_{50}$ (μm) | 11.7 | 33.5 | 15.4 | 21.0 | 7.0 | 29.3 | 38.5 | 30.6 |
| $d_{90}$ (μm) | 57.4 | 80.8 | 39.3 | 48.5 | 21.5 | 80.0 | 90.0 | 70.0 |
| $d_f = (d_{50} - d_{10})/d_{50}$ | 0.68 | 0.63 | 0.80 | 0.71 | 0.51 | 0.80 | 0.62 | 0.47 |
| $d_b = (d_{90} - d_{10})/d_{50}$ | 4.59 | 2.04 | 2.35 | 2.02 | 2.57 | 2.53 | 1.96 | 1.76 |
| % Total Pore Volume <10 μm | 42.7 | 7.5 | 27.9 | 17.6 | — | 20.8 | 4.9 | 3.8 |
| % Total Pore Volume >30 μm | 18.6 | — | 14.9 | 25.8 | — | — | — | — |
| $P_{10}$ | 16.7 | 23.8 | 17.5 | 16.1 | 14.6 | 24.3 | 23.8 | 25.8 |

The inventive and comparative examples in the Tables are discussed below with regard to the present invention.

Example 1 illustrates that the pore microstructure of the present invention can be achieved using a batch composition comprising fine alumina-forming sources having a weighted average median particle diameter (hereinafter referred to as "the median particle diameter of the alumina-forming source") of 4 μm and comprising 16 wt % kaolin, but only when the talc and silica-forming sources are of a coarse particle size such as 23 μm, and when the heating rates from 1200 to 1300° C. ("HR1") and from 1300 to 1360° C. ("HR2") are very fast, such as 150° C./hr. Example 1 is fired at 1400° C. for 15 hours. Example 2 shows that when this same composition is fired at a higher temperature such as 1420° C., the CTE is desirably further reduced.

Examples 3 to 8 show that increasing the median particle diameter of the alumina-forming sources to about 8 to 9 μm in a batch composition with about 16% kaolin results in inventive bodies even without a pore former, when the talc and silica-forming sources are of a coarse particle size such as 23 μm, and when the heating rates from 1200 to 1300° C. ("HR1") and from 1300 to 1360° C. ("HR2") are very fast, such as 90 to 150° C./hr. Furthermore, the use of coarser alumina-forming sources results in a narrower pore size distribution, as indicated by lower values of $d_f$ and $d_b$. Especially desirably low values of $d_f$ from 0.26 to 0.33, and $d_b$ from 0.91 to 1.48, are achieved for Examples 4 to 7, which are based upon raw material Composition 3. Example 7 shows the benefit of firing at a higher temperature for reducing CTE relative to Examples 4 and 5.

Examples 9 to 14 demonstrate that, by adding 5 to 20% pore former to a batch composition comprising 16 wt % kaolin, alumina-forming sources having a weighted average median particle diameter of 9.4 μm, and talc and silica-forming sources having median particle diameters of 23 μm, inventive properties can still be achieved when the HR1 and HR2 heating rates are reduced to 50° C./hr. Examples 10, and 12 to 14 show the advantage of firing at a higher temperature and a longer hold time for lowering CTE.

Examples 15 to 27 illustrate inventive properties for batch compositions comprising 6 to 16% kaolin or calcined kaolin, alumina-forming sources having a weighted average median particle diameter of 9.5 to 9.9 μm, and talc and silica-forming sources having median particle diameters of 23 μm, with 0 to 20 wt % pore former.

Examples 28 to 33 demonstrate inventive properties with alumina-forming sources having a weighted average median particle diameter of only 5.2 to 5.9 μm and no pore former when kaolin is absent from the batch composition. Examples 29-31 show that reducing the 1300-1360° C. heating rate to 6° C./hr is very beneficial for lowering CTE. Especially low CTE and $d_f$ value are obtained when fired at 1430° C. for 30 hours with a 1200-1300° C. heating rate of 100° C./hr and a 1300-1360° C. heating rate of 6° C./hr (Example 31).

Examples 34 to 36 show that the inventive properties are obtained with alumina-forming sources having a weighted average median particle diameter of only 5.2 μm and only 5 wt % pore former when kaolin is absent from the batch composition. The addition of 5% pore former is beneficial in increasing the porosity to 44-47%, compared to 41-45% for Examples 28-33 without pore former. Relative to Example 34, Example 35 shows the benefit of a higher firing temperature and slower 1300-1360° C. heating rate in reducing CTE. Example 36 shows that increasing the hold time offers a further reduction in CTE. Especially low CTE and $d_f$ value are obtained when fired at 1430° C. for 30 hours with a 1200-1300° C. heating rate of 100° C./hr and a 1300-1360° C. heating rate of 6° C./hr (Example 36).

Examples 37 to 44 demonstrate the benefit of adding 10% graphite for increasing the porosity to 46-52%, depending upon firing cycle. Examples 40 to 44 show that CTE is reduced when the 1300-1360° C. firing rate is ≦10° C./hr, the top temperature is 1420-1430° C., and the hold time is 15-30 hours. Examples 40 and 44 provide another preferred combination of low CTE and low value of $d_f$.

Example 45 provides inventive properties with 5.2 μm alumina sources, no kaolin, and 15% pore former.

Example 46 illustrates the use of alumina-forming sources having a weighted average median particle diameter of 7.6 μm with no kaolin and no pore former.

Example 47 shows that the talc median particle diameter can be lowered to 6.5 μm in combination with a 25 μm silica-forming source and alumina-forming sources having a median particle diameter of about 9 μm, provided that a fast heating rate, such as 100° C./hr, is utilized from 1200-1360° C./hr. Examples 48 and 49 illustrate that the median particle diameter of the silica-forming source can be lowered to 3.5 μm in combination with a 23 μm talc and alumina-forming sources having a median particle diameter of about 9 μm when the 1200-1360° C. heating rate is 100° C./hr. Examples 50 and 51 demonstrate that the median particle diameter of the talc can be reduced to 6.5 μm and the median particle diameter of the silica-forming source can be lowered to 3.5 μm in combination with alumina-forming sources having a median particle diameter of about 9 μm and 5 wt % pore former when the 1200-1360° C. heating rate is 100° C./hr. Examples 48, 50 and 51 provide especially low values for $(d_{50}-d_{10})/d_{50}$ and $(d_{90}-d_{10})/d_{50}$.

Examples 52-54 combine a 23 μm talc, 23 μm silica-forming source, and alumina-forming sources having a median particle diameter of about 9 μm without pore former or kaolin to provide especially narrow pore size distributions and low values of $d_f$ when heated at 47 to 100° C./hr from 1200 to 1360° C.

Example 55 demonstrates that the median particle diameter of the talc may be increased to 28 μm and that of the silica-forming source may be increased to 35 μm in combination with alumina-forming sources having a median particle diameter of about 9 μm and 20 wt % pore former to yield inventive properties when the heating rate from 1200 to 1360° C. is reduced to 28° C./hr.

Example 56 provides an especially narrow pore size distribution and low CTE through the use of a 23 μm talc, 23 μm silica-forming source, 5.9 μm alumina-forming sources, and 10 wt % graphite with no kaolin.

Tables 21 to 23 provide comparative examples based upon the prior art. Examples C1 to C9 show that the combination of 16% kaolin and alumina-forming sources having a weighted average median particle diameter of only 4 μm, when fired at slow 1200-1300° C. and 1300-1360° C. heating rates of only 25-28° C./hr yield fired bodies with $d_{10}$ less than 8 μm, even when the talc and silica-forming sources are of a 15 to 23 μm median particle diameter and 0 to 40% pore former are added. The computed $P_{10}$ parameters for these examples are all less than 18.5.

Examples C10 to C15 demonstrate that increasing the weighted average median particle diameter of the alumina-forming sources to 5.7 μm still results in a fired body with $d_{10}$ less than 8 μm when 16% kaolin is present in the batch composition and the 1200-1300° C. and 1300-1360° C. heating rates are only 23° C./hr. The computed $P_{10}$ parameters for these examples are all less than 18.5.

Example C16 illustrates that, when 16% kaolin is present in the batch composition, the fired body exhibits a $d_{10}$ less than 8 μm even when the weighted average median particle diameter of the alumina-forming sources is 9.9 μm and the 1200-1300° C. and 1300-1360° C. heating rates are 48° C./hr in the absence of a pore former. Again, the computed $P_{10}$ parameter for this example is less than 18.5.

Examples C17 to C20 show that $d_{90}$ is greater than 35 μm when the median particle diameters of the talc and/or silica-forming sources are larger than 35 μm.

Example C21 demonstrates that, even in the absence of kaolin, $d_{10}$ is smaller than 8 μm when the median particle diameter of the talc source is 5 μm, the heating rates from 1200-1300° C. and 1300-1360° C. are only 25° C./hr, and no pore former is provided. The computed $P_{10}$ parameter for this example is less than 18.5.

Examples C22 to C24 illustrate that, in the absence of kaolin, $d_{90}$ is greater than 35 μm when the median particle diameter of the talc source is larger than 35 μm.

It should also be understood that while the present invention has been described in detail with respect to certain illustrative and specific aspects thereof, it should not be considered limited to such, as numerous modifications are possible without departing from the broad scope of the present invention as defined in the appended claims.

What is claimed is:

1. A ceramic honeycomb article, comprising:
   a porous ceramic cordierite composition having a total porosity (% P), wherein % P<54; and
   pore size distribution exhibiting:
   $d_{10} \geq 8$ μm, wherein $d_{10}$ is the pore diameter at which 10% of the total porosity is comprised of pores having a diameter smaller than $d_{10}$;
   $d_{90} \leq 35$ μm, wherein $d_{90}$ is the pore diameter at which 90% of the total porosity is comprised of pores having a diameter smaller than $d_{90}$; and
   $d_f \leq 0.50$, wherein $d_f = (d_{50}-d_{10})/d_{50}$.

2. The ceramic article of claim 1 wherein the pore size distribution comprises a $d_{10} \geq 9$ μm and $d_{90} \leq 33$ μm.

3. The ceramic article of claim 2 wherein the pore size distribution comprises a $d_{10} \geq 10$ μm and $d_{90} \leq 30$ μm.

4. The ceramic article of claim 1 wherein the pore size distribution comprises a value, expressed in μm, of $d_{90} \leq 3.6 (d_{10})-2.4$.

5. The ceramic article of claim 1 wherein the pore size distribution comprises a value, expressed in μm, of $d_{90} \leq 3.6 (d_{10})-7.4$.

6. The ceramic article of claim 1 wherein the pore size distribution comprises a value, expressed in μm, of $d_{90} \leq 3.6 (d_{10})-12.4$.

7. The ceramic article of claim 1 further comprising $45 \leq \% P < 52$.

8. The ceramic article of claim 1 wherein the total porosity is comprised of pores having a median diameter $d_{50}$, wherein 10 μm $\leq d_{50} \leq$ 22 μm.

9. The ceramic article of claim 8 wherein the total porosity is comprised of pores having a median diameter $d_{50}$, wherein 12 μm $\leq d_{50} \leq$ 20 μm.

10. The ceramic article of claim 8 wherein the total porosity is comprised of pores having a median diameter $d_{50}$, wherein 10 μm $\leq d_{50} \leq$ 14 μm.

11. The ceramic article of claim 8 wherein the total porosity is comprised of pores having a median diameter $d_{50}$, wherein 14 μm $\leq d_{50} \leq$ 17 μm.

12. The ceramic article of claim 8 wherein the total porosity is comprised of pores having a median diameter $d_{50}$, wherein 17 μm $< d_{50} \leq$ 22 μm.

13. The ceramic article of claim 1 wherein the pore size distribution has a $d_f \leq 0.40$.

14. The ceramic article of claim 13 wherein the pore size distribution has a $d_f \leq 0.35$.

15. The ceramic article of claim 13 wherein the pore size distribution has a $d_f \leq 0.30$.

16. The ceramic article of claim 1 wherein the porous ceramic cordierite composition further exhibits a coefficient of thermal expansion $\leq 8.0 \times 10^{-7}/°$ C. across the temperature range of from 25° C. to 800° C.

17. The ceramic article of claim 16 wherein the porous ceramic cordierite composition further exhibits a coefficient of thermal expansion $\leq 6.0 \times 10^{-7}/°$ C. across the temperature range of from 25° C. to 800° C.

18. The ceramic article of claim 16 wherein the porous ceramic cordierite composition further exhibits a coefficient of thermal expansion $\leq 4.0 \times 10^{-7}/°$ C. across the temperature range of from 25° C. to 800° C.

19. The ceramic article of claim 1 wherein the porous ceramic cordierite composition further comprises a pore size distribution having $d_b \leq 1.4$, wherein $d_b = (d_{90} - d_{10})/d_{50}$.

20. The ceramic article of claim 19 wherein the porous ceramic cordierite composition further comprises a pore size distribution having $d_b \leq 1.0$.

21. The ceramic article of claim 1 wherein the porous ceramic cordierite composition further exhibits a coefficient of thermal expansion $\leq 8.0 \times 10^{-7}/°$ C. across the temperature range of from 25° C. to 800° C., % P $\geq$ 47%, and $d_f \leq 0.45$.

22. The ceramic article of claim 21 wherein the porous ceramic cordierite composition further exhibits a coefficient of thermal expansion $\leq 7.0 \times 10^{-7}/°$ C. across the temperature range of from 25° C. to 800° C., % P $\geq$ 48%, and $d_f \leq 0.40$.

23. The ceramic article of claim 1 wherein the volume of pores larger than 30 μm is <15% of the total pore volume and the volume of pores finer than 10 μm is <20% of the total pore volume.

24. The ceramic article of claim 23 wherein the volume of pores larger than 30 μm is <12% of the total pore volume and the volume of pores finer than 10 μm is <15% of the total pore volume.

25. The ceramic article of claim 23 wherein the volume of pores larger than 30 μm is <11% of the total pore volume and the volume of pores finer than 10 μm is <13% of the total pore volume.

26. The ceramic article of claim 1 wherein the percentage of the total pore volume comprised of pores with diameters larger than 30 μm is less than a quantity {17−0.3 (% TPV<10 μm)}, where % TPV<10 μm is the percentage of the total pore volume that is comprised of pores finer than 10 μm.

27. The ceramic article of claim 26 wherein the percentage of the total pore volume comprised of pores with diameters larger than 30 μm is less than a quantity {15−0.3 (% TPV<10 μm)}, where % TPV<10 μm is the percentage of the total pore volume that is comprised of pores finer than 10 μm.

28. The ceramic article of claim 26 wherein the percentage of the total pore volume comprised of pores with diameters larger than 30 μm is less than a quantity {13−0.3 (% TPV<10 μm)}, where % TPV<10 μm is the percentage of the total pore volume that is comprised of pores finer than 10 μm.

29. The ceramic article of claim 1 wherein the porous ceramic cordierite composition exhibits a ratio of modulus of rupture to elastic modulus, MOR/E, as measured at room temperature, of at least 0.06%.

30. The ceramic article of claim 29 wherein the ratio of modulus of rupture to elastic modulus is at least 0.07%.

31. The ceramic article of claim 29 wherein the ratio of modulus of rupture to elastic modulus is at least 0.08%.

32. The ceramic article of claim 1 further comprising % P $\geq$ 40%.

33. A method for manufacturing a ceramic honeycomb article, comprising the steps of:

providing a plasticized cordierite precursor batch composition containing:
inorganic batch components selected from a talc source; an alumina forming source; a kaolin source; and a silica forming source;
an optional pore former;
a liquid vehicle; and
a binder;
forming a honeycomb green body from the plasticized cordierite precursor batch composition; and
firing the honeycomb green body under conditions effective to convert the honeycomb green body into a ceramic honeycomb article comprising a porous ceramic cordierite composition,
wherein the porous ceramic cordierite composition comprises a total porosity (% P), wherein % P<54%; and a pore size distribution comprising: a $d_{10} \geq 8$ μm, wherein $d_{10}$ is the pore diameter at which 10% of the total porosity is comprised of pores having a diameter smaller than $d_{10}$; a $d_{90} \leq 35$ μm, wherein $d_{90}$ is the pore diameter at which 90% of the total porosity is comprised of pores having a diameter smaller than $d_{90}$; and a $d_f \leq 0.50$ wherein $d_f = (d_{50} - d_{10})/d_{50}$.

34. The method of claim 33 wherein the effective firing conditions comprise firing the honeycomb green body at a maximum soak temperature $\geq$ 1360° C.; and wherein the method satisfies the relationship $P_{10} \geq 18.5$, where $P_{10} = 3.503[\log_{10}(HR_1)] + 3.106[\log_{10}(HR_2)] + 0.00446[(wt\% \text{ talc sources})(d_{50} \text{ talc sources})] + 0.00497[(wt\% \text{ silica-forming sources})(d_{50} \text{ silica-forming sources})] + 0.00857[(wt\% \text{ alumina-forming sources})(d_{50} \text{ alumina-forming sources})] - 0.062(wt\% \text{ kaolin sources}) + 0.264(wt\% \text{ pore former}) - 0.0147[(wt\% \text{ kaolin sources})(wt\% \text{ pore former})]$; and where $HR_1$ is defined as the heating rate in ° C./hr across a first temperature range of from 1200° C. to 1300° C. and $HR_2$ is defined as the heating rate in ° C./hr across a second temperature range of from 1300° C. to 1360° C., and where the median particle diameter of the talc source is $\leq$ 35 μm and the median particle diameter of the silica forming source is $\leq$ 35 μm.

35. The method of claim 34 wherein $P_{10} \geq 20.0$.

36. The method of claim 33 wherein the inorganic batch components are selected to provide, after firing, a sintered phase cordierite composition, as characterized on a weight percent oxide basis, consisting essentially of:
about 49 wt % to about 53 wt % $SiO_2$,
about 33 wt % to about 38 wt % $Al_2O_3$, and
about 12 wt % to about 16 wt % MgO.

37. The method of claim 33 wherein the effective firing conditions comprise firing the honeycomb green body at a maximum soak temperature in the range of from 1350° C. to 1450° C. and subsequently maintaining the maximum soak temperature for a soak time sufficient to convert the honeycomb green body into a ceramic honeycomb article.

38. The method of claim 37 wherein the maximum soak temperature is in the range of from 1410° C. to 1435° C.

39. The method of claim 37 wherein the soak time is in the range of from 5 to 50 hours.

40. The method of claim 33 wherein the effective firing conditions comprise firing the honeycomb green body at a maximum soak temperature $\geq$ 1360° C.; and wherein the method satisfies the relationship $P_c < 10.0$, where $P_c = 1.872(HR2) - 0.00128(HR2)(T_{max}) - 0.00230(HR2)(wt\% \text{ kaolin}) + 0.0197(wt\% \text{ kaolin})(d_{50} \text{ kaolin}) - 0.0939(\text{Hold Time}) + 0.0420(wt\% \text{ α-alumina})(d_{50} \text{ α-alumina}) + 0.0103(wt\% \text{ hydrated alumina})(d_{50}$ hydrated alumina)+0.207(wt % pore former)−0.00146(% pore former)(d$_{50}$ pore former)

where HR$_2$ is defined as the heating rate in ° C./hr across a temperature range of from 1300° C. to 1360° C., where T$_{max}$ is the maximum temperature (° C.) during firing, where Hold Time is the time (hours) for which the article is held at the maximum temperature, and where the median particle diameters, d$_{50}$, are in microns.

41. The method of claim 40 wherein P$_c$≦6.0.

42. The method of claim 33 wherein:

the batch composition comprises from 38 to 42 wt. % of a talc or calcined talc having a median particle diameter of 20 to 30 μm and a talc morphology index of at least 0.85; from 6 to 18 wt. % of a kaolin or calcined kaolin having a median particle diameter of 2 to 5 μm; from 12 to 20 wt. % of an alpha-alumina having a median particle diameter of 5 to 8 μm; from 12 to 20 wt. % of an aluminum hydroxide having a median particle diameter of 10 to 15 μm; from 10 to 20 wt. % of a silica-forming source having a median particle diameter of 20 to 30 μm; from 5 to 20 wt. % of a graphite pore former having a median particle diameter of 20 to 60 μm; and from 0 to 7 wt % of a dispersible boehmite; and wherein the honeycomb article is fired at a rate of at least 40° C./hr from 1200 to 1300° C., and at a rate of at least 40° C./hr from 1300 to 1360° C., and held for 10 to 30 hours at a maximum temperature of 1410 to 1430° C.

43. The method of claim 42, where the heating rate from 1200 to 1300° C. is at least 100° C./hr.

44. The method of claim 33, wherein:

the batch composition comprises from 38 to 42 wt % of a talc or calcined talc having a median particle diameter of 20 to 30 μm and a talc morphology index of at least 0.85; from 20 to 23 wt. % of an alpha-alumina having a median particle diameter of 5 to 8 μm; from 8 to 18 wt. % of an aluminum hydroxide having a median particle diameter of 3 to 7 μm; from 18 to 24 wt. % of a silica-forming source having a median particle diameter of 20 to 30 μm; from 0 to 20 wt. % of a graphite pore former having a median particle diameter of 20 to 60 μm; and from 0 to 7 wt % of a dispersible boehmite;

wherein the batch composition is absent of a kaolin source; and wherein the formed honeycomb green body is fired at a rate of at least 20° C./hr from 1200 to 1300° C.; at a rate of not more than 30° C./hr from 1300 to 1360° C.; and holding at a maximum soak temperature of from 1410 to 1430° C. for 10 to 30 hours.

45. The method of claim 44 wherein the heating rate from 1200 to 1300° C. is at least 50° C./hr, the heating rate from 1300 to 1360° C. is not more than 10° C./hr, and the maximum temperature is 1425 to 1430° C.

46. The method of claim 33, wherein:

the batch composition comprises from 38 to 42 wt % of a talc or calcined talc having a median particle diameter of from 6 to 12 μm; from 20 to 23 wt. % of an alpha-alumina having a median particle diameter of 5 to 8 μm; from 8 to 18 wt. % of an aluminum hydroxide having a median particle diameter of 10 to 15 μm; from 18 to 24 wt. % of a silica-forming source having a median particle diameter of from 3 to 6 μm; from 0 to 20 wt. % of a graphite pore former having a median particle diameter of 10 to 40 μm; and from 0 to 7 wt. % dispersible boehmite;

wherein the batch composition is absent of a kaolin source; and wherein the honeycomb article is fired at a rate of at least 50° C./hr from 1200 to 1300° C., and held at a maximum temperature of 1420 to 1430° C. for 15 to 30 hours.

47. The method of claim 46 where the heating rate from 1200 to 1300° C. is at least 100° C./hr.

48. The method of claim 33, wherein the pore former comprises graphite.

\* \* \* \* \*